(12) United States Patent
Albrecht et al.

(10) Patent No.: US 6,462,904 B1
(45) Date of Patent: Oct. 8, 2002

(54) TIMING BASED SERVO SYSTEM FOR MAGNETIC TAPE SYSTEMS

(75) Inventors: Thomas Robert Albrecht; Robert Carl Barrett, both of San Jose; James Howard Eaton, Morgan Hill, all of CA (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/711,109

(22) Filed: Nov. 9, 2000

Related U.S. Application Data

(62) Division of application No. 09/420,889, filed on Oct. 19, 1999, now Pat. No. 6,282,051, which is a division of application No. 08/865,540, filed on May 29, 1997, now Pat. No. 6,021,013, which is a division of application No. 08/270,207, filed on Jun. 30, 1994, now Pat. No. 5,689,384.

(51) Int. Cl.⁷ ............................................. G11B 5/187
(52) U.S. Cl. ...................................................... 360/122
(58) Field of Search ................................ 360/121–125, 360/108, 109, 84, 85; 29/603.18

(56) References Cited

U.S. PATENT DOCUMENTS

| | | | | |
|---|---|---|---|---|
| 3,427,606 A | | 2/1969 | Black et al. | 360/77.11 |
| 3,458,785 A | | 7/1969 | Sordello | 360/77.11 |
| 3,686,649 A | | 8/1972 | Behr | 360/77.07 |
| 4,007,493 A | | 2/1977 | Behr et al. | 360/77.07 |
| 4,074,328 A | | 2/1978 | Hardwick | 360/77.06 |
| 4,149,198 A | | 4/1979 | Behr et al. | 360/77.07 |
| 4,166,282 A | | 8/1979 | Ragle et al. | 360/77.06 |
| 4,209,810 A | | 6/1980 | Ragle et al. | 360/77.06 |
| 4,314,290 A | | 2/1982 | Ragle | 360/77.06 |
| 4,346,413 A | | 8/1982 | Hack | 360/77 |
| 4,347,534 A | | 8/1982 | Kimura | 360/77.12 X |
| 4,549,232 A | | 10/1985 | Axmear et al. | 360/77 |
| 4,598,327 A | | 7/1986 | Jen et al. | 360/77.07 |
| 4,977,471 A | | 12/1990 | Nigam | 360/77.08 |
| 5,003,412 A | | 3/1991 | Bizjak et al. | 360/77.01 |
| 5,055,951 A | | 10/1991 | Behr | 360/77.12 |
| 5,132,861 A | | 7/1992 | Behr et al. | 360/77 |
| 5,398,145 A | | 3/1995 | Jeffers et al. | 360/77.12 |
| 5,455,729 A | * | 10/1995 | Nelson et al. | 360/108 |
| 5,523,539 A | * | 6/1996 | Hoogerwerf et al. | 360/122 |
| 5,585,978 A | * | 12/1996 | Rottenburg et al. | 360/109 |
| 5,729,890 A | * | 3/1998 | Rottenburg et al. | 29/603.18 |
| 6,282,051 B1 | * | 8/2001 | Albrecht et al. | 360/122 |

OTHER PUBLICATIONS

Information Disclosure Statement with Appendix A and B, submitted on Jan. 20, 1995, In re Application of T. R. Albrecht et al., Ser. No. 08/270,207; Filed Jul. 1, 1994, Entitled "Timing Based Servo System For Magnetic Tape Systems".

"Timed–Based, Track–Following Servos for Linear Tape Drives," Thomas Albrecht, Robert Barrett, and James Eaton, IBM, Oct. 1997, Data Storage.

* cited by examiner

Primary Examiner—Allen Cao
(74) Attorney, Agent, or Firm—Dan Hubert & Assoc.

(57) ABSTRACT

A track following servo system is disclosed for use with magnetic tape systems in which magnetic servo track patterns contain transitions recorded at more than on azimuthal orientation across the width of the servo track. The timing of a signal derived from reading at any point across the width of such a pattern varies continuously as the read head is moved across the servo track. The pattern is read by a servo read head whose width is small compared to the servo track pattern. The combination of a wide servo pattern and a narrow servo read head offers excellent position sensing linearity and dynamic range. In the preferred embodiment, the servo read head is also narrow with respect to the data tracks, which provides the additional advantages of superior immunity to position sensing errors caused by defects or temporal variations in the servo read head, defects in the servo pattern on the tape, wear of the head or tape, or debris collection on the head or tape. Position sensing with this system is achieved by deriving a ratio of two servo pattern intervals and therefore is insensitive to tape speed during reading. The servo patterns may include spacing intervals recognizable for error detection and correction purposes. Servo tracks are recorded using a patterned multiple gap servo write head whose magnetic gaps have geometries appropriate to generate the desired servo patterns. The patterned gaps of the servo write head are produced by photolithographically defined electroplating of permalloy on a ferrite ring head structure.

13 Claims, 23 Drawing Sheets

| ADDRESS | X1 | X2 | Y1 | Y2 | D1 | D2 |
|---|---|---|---|---|---|---|
| 0 | 0 | 0 | 0 | 0 | 0 | 0 |
| 1 | 0 | 0 | 1 | 1 | 1 | 1 |
| 2 | 0 | 0 | 2 | 2 | 2 | 2 |
| 3 | 0 | 0 | 3 | 3 | 1 | 1 |
| 4 | 0 | 0 | 4 | 4 | 0 | 0 |
| 5 | 0 | 0 | 4 | 4 | 0 | 0 |
| 6 | +1 | +1 | 4 | 4 | 1 | 1 |
| 7 | +2 | +2 | 4 | 4 | 2 | 2 |
| 8 | +3 | +3 | 4 | 4 | 1 | 1 |
| 9 | +4 | +4 | 4 | 4 | 0 | 0 |
| 10 | +4 | +3 | 4 | 3 | 0 | -2 |
| 11 | +3 | +2 | 3 | 2 | -2 | -4 |
| 12 | +2 | +1 | 2 | 1 | -4 | -2 |
| 13 | +1 | 0 | 1 | 0 | -2 | 0 |
| 14 | 0 | 0 | 0 | 0 | 0 | 0 |
| 15 | 0 | 0 | 0 | 0 | 0 | 0 |

*FIG. 18*

TIMING BASED SERVO SYSTEM FOR MAGNETIC TAPE SYSTEMS

CROSS-REFERENCE TO RELATED APPLICATIONS

This application is a divisional of U.S. patent application Ser. No. 09/420,889 filed on Oct. 19, 1999, U.S. Pat. No. 6,282,051 which is a divisional of U.S. patent application Ser. No. 08/865,540 filed on May 29, 1997, now U.S. Pat. No. 6,021,013 which is a divisional of U.S. patent application Ser. No. 08/270,207 filed Jun. 30, 1994 and issued as U.S. Pat. No. 5,689,384 on Nov. 18, 1997.

BACKGROUND OF THE INVENTION

1. Field of the Invention

This invention relates generally to recording and reading data from magnetic storage media and, more particularly, to servo control systems that maintain the position of a magnetic head relative to tracks in magnetic storage media.

2. Description of the Related Art

The recording and reading of data in tracks on magnetic storage media requires precise positioning of magnetic read/write heads. The read/write heads must be quickly moved to, and maintained centered over, particular data tracks as recording and reading of data takes place. The magnetic heads can record and read data as relative movement occurs between the heads and the magnetic storage media in a transducing direction. The heads are moved from track to track across the width of the tracks in a translating direction, which is perpendicular to the transducing direction.

For example, a recordable disk typically contains concentric data tracks and is rotated beneath a magnetic head. The direction of rotation defines the transducing direction. Radial movement from track to track defines the translating direction. A magnetic tape typically contains data tracks that extend along the length of the tape, parallel to the tape edges, in the transducing direction. In magnetic tape helical scan systems, however, the tape is moved beneath heads that are moved at an angle across the width of the tape, the diagonal direction defining the transducing direction.

Storage devices that read and record data on magnetic media typically use servo control systems to properly position the data heads in the translating direction. The servo control systems derive a position signal from a servo magnetic head that reads servo control information recorded in servo tracks on the storage media. Typically, the servo control information comprises two parallel but dissimilar patterns. The servo head follows the boundary between the two dissimilar servo patterns, which are recorded in alignment with the data tracks. When the servo head is centered relative to the boundary between the servo patterns, the associated read/write head is centered relative to the data track.

The servo patterns might comprise bursts of half-width magnetic flux transitions, extending halfway across the servo track, that have different phases or frequencies. These patterns are often referred to as "half tracks" because a single servo position is defined by an adjacent pair of the patterns. Generally, the servo head has a width greater than or equal to approximately one-half servo track. With a half-width servo head it is readily possible to determine which direction to move the head for centering up until the head has moved more than one-half track off center. Servo heads that are less than one-half track width would not be able to determine which direction to move as soon as the head was completely over one half of the servo track or the other. Servo heads that are greater than one-half track width are most commonly used with imbedded servo systems, which use the same read head for servo and for data. With such systems, every other pattern is made different to avoid the problem of the head running into an adjacent track pattern, which then would not be able to determine which direction in which to move.

An alternative to the half-track servo control approach is described in U.S. Pat. No. 3,686,649 to Behr, which describes a disk drive servo control system that uses servo control information comprising lines of magnetic flux transition that extend across a servo track width at two different angles from a line parallel to a disk radius. A pair of such transition lines define a control zone in the form of a symmetric trapezoid. A control head detects a positive-going pulse generated by a first transition and a negative-going pulse generated by a second transition. The signal thus generated comprises a pulsed position signal that can be compared with a reference signal to indicate how far the control head has deviated from the servo track centerline. The system is said to permit more than 200 tracks per inch on a storage disk. Nevertheless, there is a demand for disk storage devices and tape storage devices of greater and greater storage density. For example, conventional disk drives can provide 5000 tracks per inch.

The half-track servo control approach has been found to be generally satisfactory for direct access storage devices, such as disk drives. Tape storage systems; operate under unique characteristics that increase the difficulty of providing higher storage densities. In magnetic tape storage systems, the storage media/magnetic head interface is not as clean as the environment typically found in disk systems and, unlike most disk systems, the magnetic tape runs substantially in contact with the magnetic head. The relatively dirty environment and continuous contact between the media and the head, as well as the relatively large width of the servo head, produces significant wear and scratching of both the media and the servo head and produces localized build-up of contaminants on the surfaces of both. As a result, the spatial response of the servo head to the servo control information changes with time, both gradually as a result of wear over time and suddenly as a result of interaction with contaminant debris.

Changes in the servo head spatial response cause errors in the position signal, so that a position signal can indicate no track misregistration when the servo head actually is displaced from the servo track centerline. Errors in the position signal are typically difficult to detect from the position signal itself. As a result, redundant servo tracks are often used for increased reliability, wherein the servo control system uses the position signal data only if the data from two or more redundant tracks agree. Redundant servo tracks reduce the tape storage media surface area available for data recording and requires more heads and supporting electronics.

From the discussion above, it should be apparent that there is a need for a servo control system that is especially suited to the magnetic tape environment, that reduces the magnitude of position signal error due to wear on the servo head and debris, and that permits position signal errors to be detected more easily. The present invention satisfies this need.

SUMMARY OF THE INVENTION

In accordance with the present invention, a track-following servo control system in a magnetic media storage device derives head position information from one or more specially patterned servo tracks. The servo patterns are comprised of magnetic transitions recorded at more than one azimuthal orientation in a servo track, such that the timing of the servo position signal pulses derived from reading the servo pattern at any point on the pattern varies continuously as the head is moved across the width of the servo track. The timing of pulses generated by the servo read head is decoded by appropriate circuitry to provide a speed invariant position signal used by the servo system to position the data heads over the desired data tracks on the storage media.

In one aspect of the invention, the servo pattern is comprised of a repeating cyclic sequence containing two different transition azimuthal orientations. For example, the pattern may comprise straight transitions essentially perpendicular to the length of the track alternating with azimuthally inclined or sloped transitions. That is, the azimuthally sloped transitions extend across the width of a track at an angle to the head transducing direction. The relative timing of transitions read by a servo read head varies linearly depending on the head position with respect to the center of the track. Speed invariance is provided by determining the ratio of two timing intervals. In particular, the ratio can be determined by normalizing the variable time interval between dissimilar transitions with the interval measured between like transitions. Maximum dynamic range and linearity are obtained by using a read head that is narrow with respect to the width of the servo track pattern and the data track width. Synchronization of the decoder to the servo pattern is accomplished by providing periodic gaps called spacing intervals or synchronization gaps in the pattern that are recognized as pattern starting points.

In another aspect of the invention, error detection and correction are accomplished through recognition of servo pattern sequences. For example, if the servo pattern contains a predetermined number of transitions between synchronization gaps, a failure to encounter the expected number of transitions between gaps indicates faulty servo track reading.

Similarly, the timing of various intervals within a servo pattern sequence must match a known format; failure to match within certain parameters indicates erroneous servo track reading. Upon detection of errors, the system may correct the false information by substituting information from a different (redundant) servo track, temporarily substituting information of an estimated value, or by other means.

Servo patterns on a tape storage media can be generated using a multiple gap servo write head. The gaps of the head contain geometries appropriate to generate the servo pattern features described above. For servo patterns comprised of straight transitions at two different azimuthal orientations, for example, a dual gap head having one narrow straight gap at each orientation is sufficient. In one feature of the invention, the patterned gaps of the head are produced by photolithographically defined plating of permalloy material on a ferrite ring head structure. Pulses of current through the windings of the write head transfer the geometric pattern of the gaps on the head to identical magnetization patterns on the tape. Appropriate timing of the pulses generates the desired pattern sequences.

In accordance with the invention, using a servo read head that is narrow compared to the data tracks written on the storage media minimizes tracking errors due to false position signals. Defects in and wear of the servo read head or servo patterns on the storage media cause minimal position errors if the servo read head is narrow. Likewise, temporary or permanent collection of debris on either the storage media or servo read head cause minimal position sensing errors if the servo read head is narrow relative to the data track widths. The system is especially suited for use with dedicated servo tracks that are always separate from data tracks. However, the system may be used in embedded servo systems as well.

In another aspect of the invention, the servo control system detects magnetic flux transitions having a first transition polarity and ignores magnetic flux transitions having a second transition polarity. Thus, the servo control information pattern groups are timed only between transitions that have the same polarity. This avoids shifts in the timing of opposite polarities of transitions that can occur due to asymmetries in the fabrication of the servo write head, in the actual servo control information writing process, the nature of the magnetic tape, and the read heads themselves. If desired, signal-to-noise ratios can be further improved by using the redundant second set of opposite polarity transitions.

Other features and advantages of the present invention should be apparent from the following description of the preferred embodiments, which illustrate, by way of example, the principles of the invention.

BRIEF DESCRIPTION OF THE DRAWINGS

FIG. 18 is a chart of data stored in the system illustrated in FIG. 13 for use with demodulating the servo pattern illustrated in FIG. 17.

DESCRIPTION OF THE PREFERRED EMBODIMENTS

Figure 1:
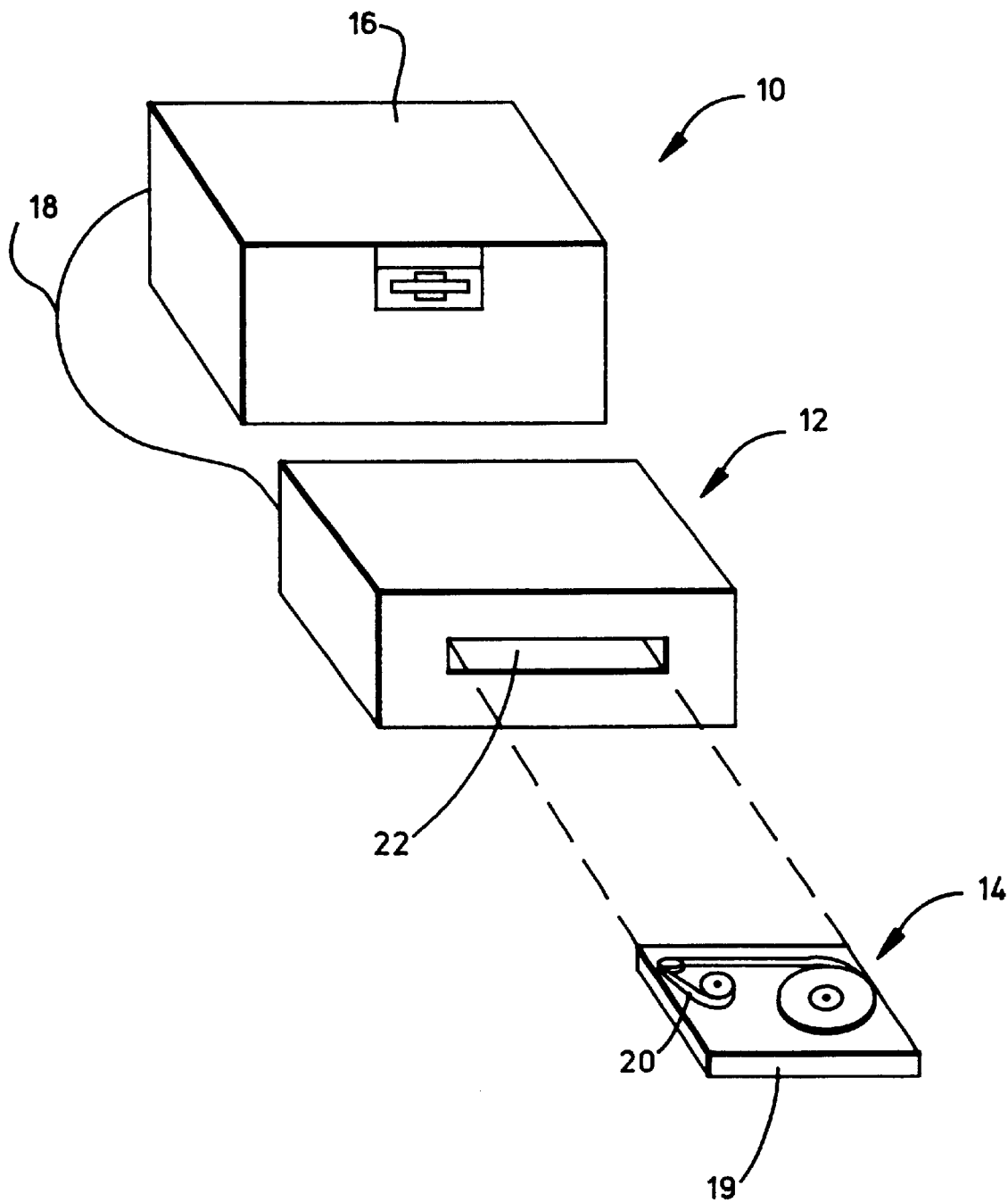
FIG. 1 is a perspective view of a tape drive storage device and associated tape cartridge constructed in accordance with the present invention.

FIG. 1 shows a timing based servo tape system 10 constructed in accordance with the present invention. The system includes a tape drive 12 that accepts a tape data cartridge 14 and is connected to a host processor 16 by a data cable 18. The tape cartridge comprises a housing 19 containing a loop of magnetic tape 20. The system is constructed for use with servo control information comprising a repeating servo pattern of magnetic flux transitions that are recorded in tracks on the magnetic tape 20 in the data cartridge and extend across the width of the tracks such that a servo position information signal generated by reading the servo control information varies continuously as a magnetic servo read head is moved across the width of a track in a translating direction, thereby indicating the relative position of the head within the track. The tape drive 12 can read the servo control information and generate a position signal to control the position of an associated data read head, or can write the servo control information into tracks on a data cartridge using a magnetic servo write head, or can do both. The system is optimized for the magnetic tape environment, so that the magnitude of the position signal error due to wear and debris is reduced and such errors are easier to detect.

The tape drive 12 includes a receiving slot 22 into which the cartridge 14 is inserted. The host processor 16 can comprise, for example, a personal computer such as the IBM Corporation "PS/2" personal computer, or can be a workstation such as the IBM Corporation "RS6000" workstation, or can be a mini computer, such as the IBM Corporation "AS400" computer. The tape drive 12 preferably is compatible with such host processors and, for example, tape library systems that employ tape cartridges, such as IBM Corporation "3480" and "3490" tape drive units. The tape cartridge 14 can assume any one of a variety of cartridge formats, including, for example, conventional 8 mm, 4 mm, ¼-inch, and ½-inch data cartridge formats.

Figure 2:
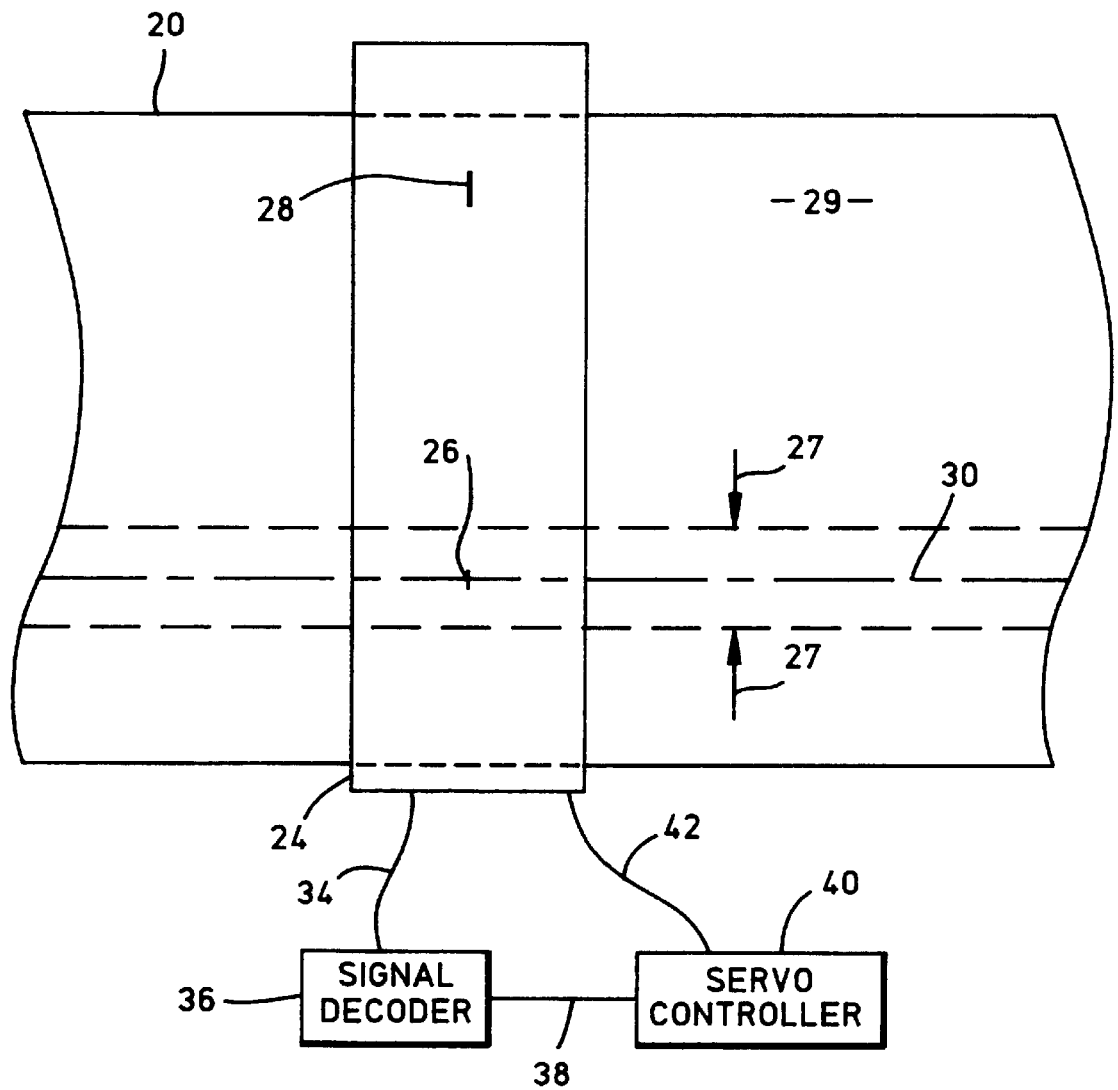
FIG. 2 is a schematic representation of the magnetic head and servo control system of the tape drive and cartridge combination illustrated in FIG. 1.

FIG. 2 is a view looking down on a portion of the magnetic tape 20 of the cartridge 14 (FIG. 1) past a head assembly 24 of the tape drive unit 12. The tape is shown in phantom with dashed lines where it passes beneath the head assembly. The head assembly is shown in solid lines and includes a relatively narrow servo read head 26 that detects a servo pattern recorded in a servo track 27 of the tape. Also shown, for purposes of illustrating relative size, is a data read head 28 of the head assembly that is positioned over a data track region 29 of the tape containing multiple data tracks for reading data recorded in a data track. FIG. 2 shows a single servo read head and a single data read head for simplicity of illustration. Those skilled in the art will appreciate that most tape systems have multiple servo tracks, multiple servo read heads, and multiple data read and write heads.

In FIG. 2, the servo track centerline 30 is indicated, extending along the length of the tape 20. FIG. 2 shows that the servo read head is relatively narrow and has a width substantially less than the width of the servo track 27. In particular, in the preferred embodiment the servo read head has a width that is less than one-half the width of a single data track (not illustrated), which typically is more narrow than a servo track.

In FIG. 2, the transducing direction of tape-head relative movement, in which the servo read head 26 can read the servo pattern, occurs when the tape 20 is moved linearly with respect to the head, along the length of the track 30. When such movement occurs, the servo pattern of magnetic flux transitions is detected by the servo read head so that it generates an analog servo read head signal that is provided via a servo signal line 34 to a signal decoder 36. The signal decoder processes the servo read head signal and generates a position signal that is delivered via a position signal line 38 to a servo controller 40. The servo controller generates a servo mechanism control signal and provides it via a control line 42 to the head assembly 24. A servo mechanism of the head assembly responds to the control signal from the servo controller by moving the head 26 laterally across the width of the servo track 30 in the translating direction. The servo controller 40 monitors the position signal from the signal decoder 36 and generates the control signal necessary to reach the desired position, so that the control signal equals the signal when the head is at the desired target.

Figure 3:
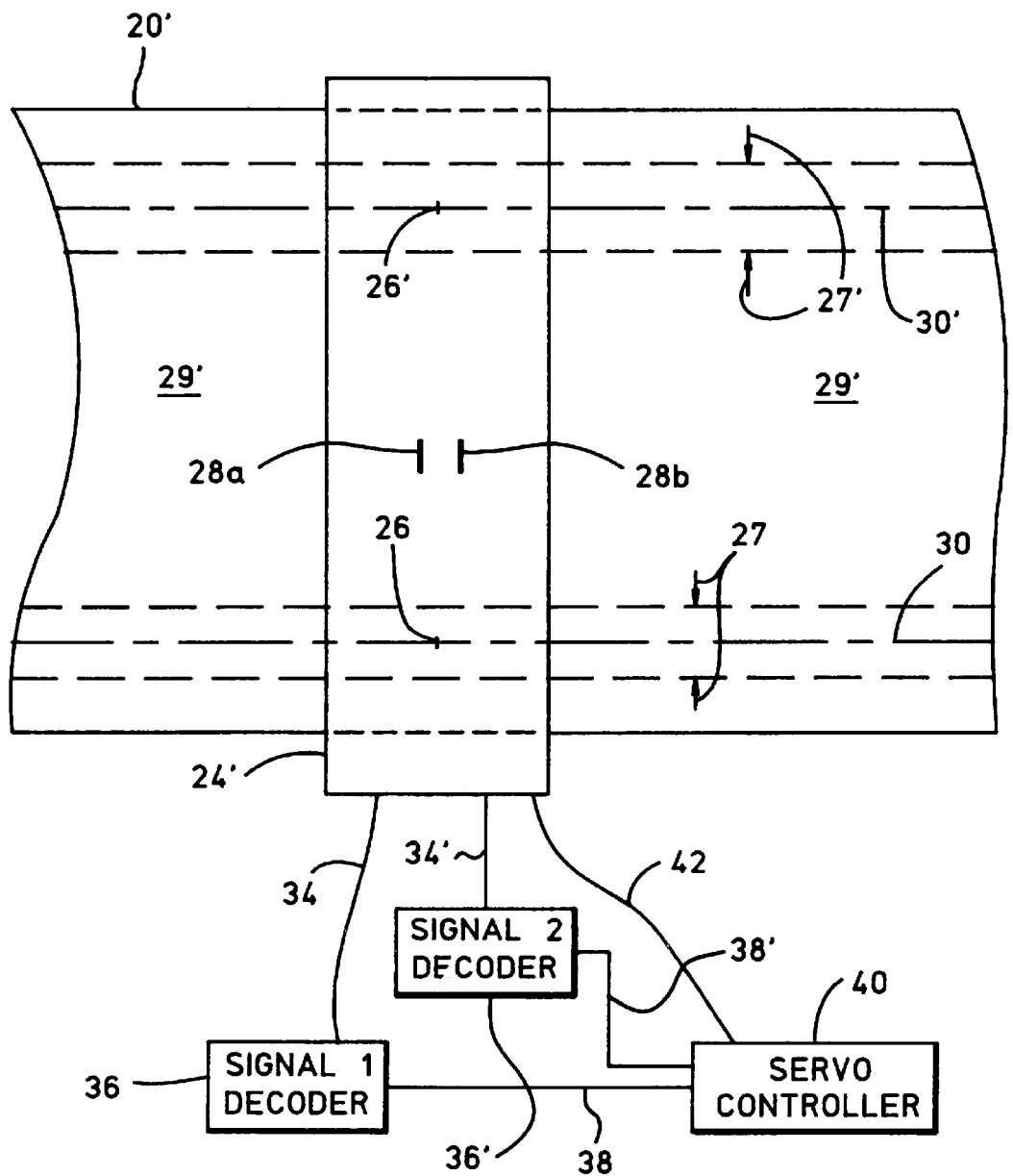
FIG. 3 is a schematic representation of an alternative head assembly arrangement in accordance with the invention.

FIG. 3 shows a multiple servo track, multiple head system constructed in accordance with the present invention. The system is similar to that shown in FIG. 2 with the following exceptions. The FIG. 3 head assembly 24' includes a data read head 28a and a data write head 28b for reading and writing data, respectively, in a data track of the tape data region 29. The tape 20' illustrated in FIG. 3 includes a second servo track 27' in addition to the first servo track 27, the servo tracks being placed on opposite sides of the data region 29. The centerline 30' of the second servo track also is shown. FIG. 3 shows that the head assembly 24' also includes a second servo read head 26' for reading servo information recorded in the second servo track 27'. It should be noted that the head assembly 24' produces two servo signals, one for each servo read head. The head assembly provides the servo signal from the first servo read head 26 over a signal line 34 to a corresponding decoder 36 and provides the servo signal from the second servo read head 26' over a second signal line 34' to a corresponding decoder 36'. These respective decoders provide their position signals to the servo controller 40. It should be noted that most tape systems include a multiplicity of data read and write heads and that only a single pair are shown in FIG. 3 for purposes of illustration.

Figure 4:
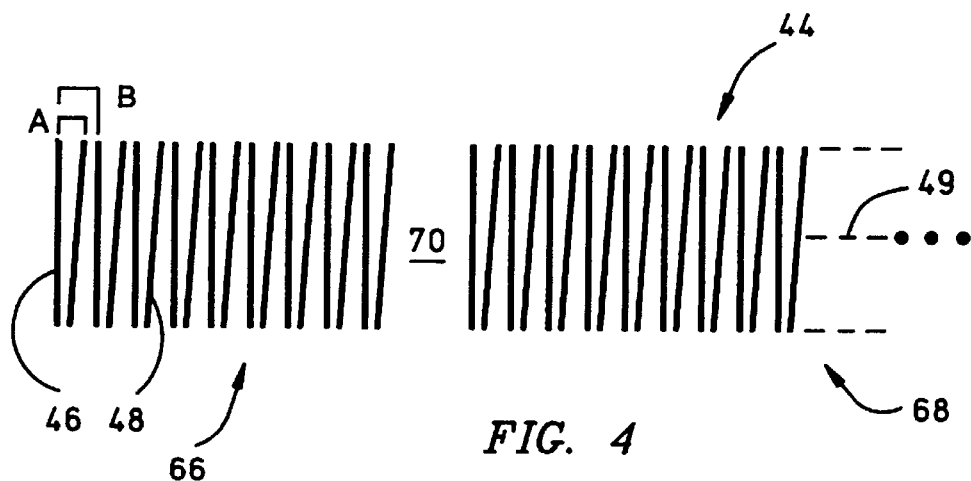
FIGS. 4, 5, and 6 are representations of three alternative servo patterns constructed in accordance with the present invention.
Figure 5:
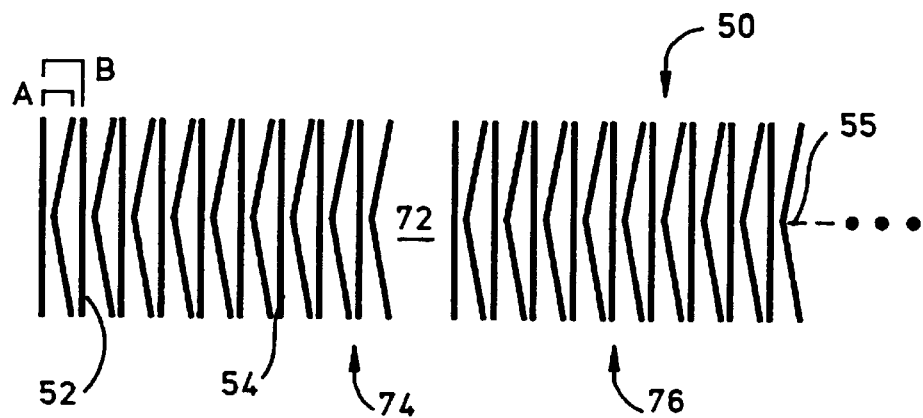
Figure 6:
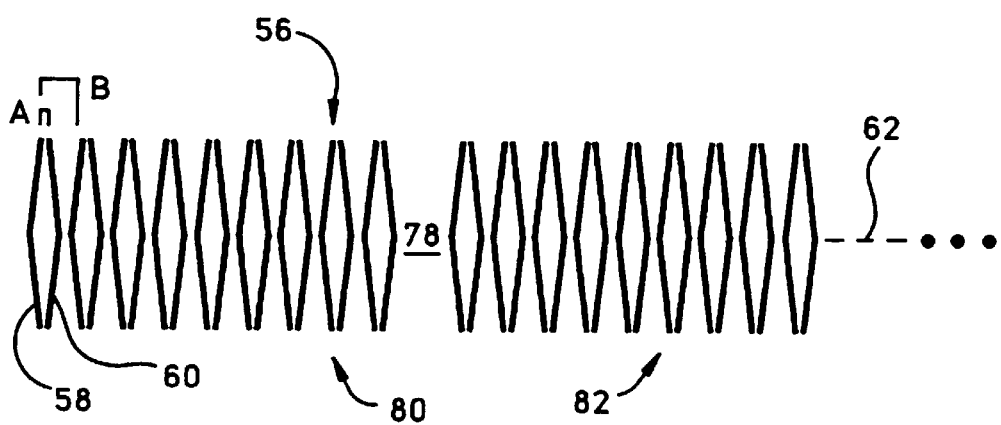

As noted above, servo patterns in accordance with the present invention comprise magnetic flux transitions that extend across the width of the servo track such that the servo read head signal produced by reading the pattern varies continuously as the servo read head is moved across the width of each servo track. FIGS. 4, 5, and 6 show alternative embodiments of servo patterns in accordance with the present invention. Those skilled in the art will recognize that the dark vertical bands, hereafter called stripes, represent magnetized areas of recorded magnetic flux that extend across the width of a servo track and that the edges of the stripes comprise flux transitions that are detected to generate the servo read head signal. The transitions have two magnetic polarities, one on each edge of a stripe. When the servo read head crosses a transition, it produces a pulse whose polarity is determined by the polarity of the transition. For example, the servo head might produce positive pulses on the leading edge of each stripe (on encountering a stripe) and negative pulses on the trailing edge (on leaving a stripe). Each servo pattern comprises a repeating sequence of different stripes having at least two orientations across the width of the track such that the first orientation is not parallel to the second orientation.

For example, in FIG. 4, the servo pattern 44 comprises an alternating sequence of first stripes 46 that extend across the width of the track substantially perpendicular to the transducing direction of a track and second stripes 48 that have an azimuthal slope with respect to the read head. That is, the second stripes are at a slope relative to the lengthwise track centerline 49. The pattern 50 illustrated in FIG. 5 comprises an alternating sequence of straight first stripes 52 that are oriented perpendicular to the track centerline and chevron-shaped second stripes 54 having two legs each with an azimuthal slope symmetrically from the other about the track centerline 55. That is, the pattern 50 comprises a band that can be characterized as being formed from two tracks that are reflections of each other, each track including one leg 54a or the other 54b of the chevrons. The FIG. 6 pattern 56 comprises chevron-shaped first 58 and second 60 stripes that are placed back-to-back so as to form a diamond-shaped pattern that is symmetric about the track centerline 62. It should be apparent that this pattern 56 also can be characterized as a servo band comprised of two servo tracks reflected about a band centerline.

With each one of the servo patterns 44, 50, 56 illustrated in FIGS. 4–6, a magnetic servo read head that is positioned above the tape 20 as the tape is moved linearly with respect to the head in the transducing direction generates an analog servo read head signal having peaks whose peak-to-peak timing varies as the head is moved across the width of the track in the translating direction. As described more fully below, the variation in timing is used to determine the relative position of the magnetic servo read head within the servo track.

The servo patterns 44, 50, 56 illustrated in FIGS. 4–6 include first and second stripes that define first and second intervals, referred to as A intervals and B intervals, respectively, that are used to generate a position signal that is independent of tape speed. The position signal is generated by timing the intervals and calculating their ratio. For these patterns, an A interval is defined as the interval along the tape transducing direction from a stripe of one type to the next stripe of the other type, while a B interval is defined as the interval along the tape transducing direction between two stripes of the same type. It should be clear that the timing intervals from stripe to stripe will vary as the servo read head is moved in the translating direction, across the width of the track. It also should be noted that only the A intervals vary; the B intervals are constant, regardless of position.

Thus, in FIG. 4, the first A interval, which will be referred to as A1, extends from the first perpendicular stripe to the first stripe having an azimuthal slope and the first B interval extends from the first perpendicular stripe to the next perpendicular stripe. Subsequent servo pattern intervals A2, A3, . . . and B2, B3, . . . can be similarly defined. In FIG. 5, the first A interval A1 extends from the first perpendicular stripe to the first chevron-shaped stripe while the first B interval B 1 extends from the first perpendicular stripe to the second perpendicular stripe. The second A interval, A2, extends from the second perpendicular stripe to the second chevron-shaped stripe. The second B interval, B2, extends from the second perpendicular stripe to the third perpendicular stripe. In FIG. 6, the first A interval A1 extends from the first chevron, comprising the left side of a first diamond, to the next chevron, comprising the right side of the first diamond, while the first B interval B 1 extends from the left side of the first diamond to the left side of the second diamond. The second A interval A2 extends from the left side of the second diamond to the right side of the second diamond. The second B interval B2 extends from the left side of the second diamond to the left side of the third diamond. It should be noted that the last stripe is not used to define an interval.

A servo control system constructed in accordance with the present invention provides a means of determining the position of the servo read head relative to the beginning and ending of the servo pattern. Determination of the position within the pattern permits the system to know the nature of the next stripe that will be read and to perform error detection and, if desired, error correction. In terms of the first servo pattern 44 illustrated in FIG. 4, for example, the system will know whether the next stripe to be read is a straight transition or is an azimuthally sloped transition. In the preferred embodiment, the position determination is provided by a periodic synchronization feature in the servo pattern that is detected by the servo decoder.

In the patterns illustrated in FIGS. 4, 5, and 6, the synchronization feature comprises spacing intervals between groups of stripes. The spacing intervals are transition free, so that no stripes occur in the transducing direction for an interval greater than the maximum interval between any two stripes within a group. If desired, information other than servo control pattern data can be placed in the spacing intervals. For example, if the gaps between stripes have at least two different lengths, information may be written in the synchronization feature spacing intervals as a serial code of gap lengths. Such information might be used to indicate data block locations, tape longitudinal position, or other information useful to the operation of the drive. The servo control system can be synchronized with the spacing intervals to provide position determination because the system will know that the next magnetic flux transition after a spacing interval is a perpendicular group stripe. The groups of stripes between successive spacing intervals are referred to as "servo bursts". Each servo burst contains a predetermined number of stripes and transitions, which can be used in error detection and correction, as described further below. The number of stripes per burst provides adequate servo control synchronization while efficiently using the tape media, such that a synchronization feature is not needed after every pair of different stripes for proper synchronization.

For example, in FIG. 4, a first servo pattern group 66 and a second servo pattern group 68 are illustrated. The first and second servo pattern groups are separated by a synchronization feature comprising a spacing interval 70. The spacing interval extends along the tape in the transducing direction for an interval greater than an A interval, which is the interval from a stripe of the first perpendicular orientation to a stripe of the second azimuthally sloped orientation. Similarly, FIG. 5 shows a spacing interval 72 between the servo bursts 74, 76 and FIG. 6 shows a start gap 78 between servo bursts 80, 82. As noted above, information other than servo control pattern data is written in these intervals.

To reduce the chance of head irregularities and control system anomalies from distorting the servo read head signal, the servo control system in accordance with the present invention times the A and B intervals only between magnetic flux transitions having the same polarity. This is done because, for example, asymmetries in the fabrication of the servo write head, variations in the actual servo writing process, and other difficulties due to the nature of the tape itself or of the read heads can cause apparent shifts in the timing of transitions having opposite polarities. Timing only between transitions of like polarity eliminates timing errors due to differences between the polarities. For example, only transition pulses such as generated by the read head in moving across the leading edge of a stripe might be used. Transition pulses generated by moving across the trailing edge of a stripe are ignored.

The signal-to-noise ratio can be further improved by using the redundant set of second transitions of opposite polarity. In such a case, a redundant serious pattern decoding system would be provided to decode the position signal separately from the magnetic flux transitions of both polarities. For purposes of this detailed description, the decoding system associated with one polarity will be described. It should be understood, however, that a similar decoding system could be provided for the transitions having opposite polarity.

Figure 7:
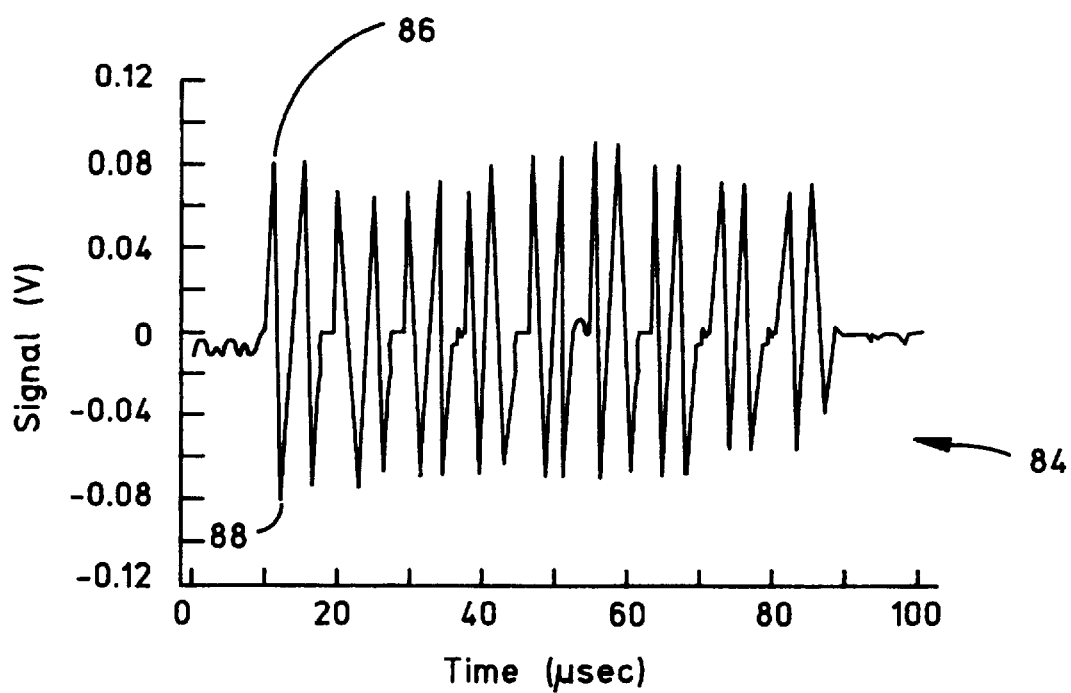
FIG. 7 is a graph of the servo information signal generated by the magnetic head illustrated in FIG. 2.

FIG. 7 shows a graph of the analog servo read head signal 84 generated by the magnetic head illustrated in FIG. 2 as it reads the servo pattern illustrated in FIG. 4. FIG. 7 shows that a first servo read head signal peak 86 occurs as the servo read head crosses the leading edge of the first stripe of FIG. 4. A first negative peak 88 in the servo read head signal occurs as the servo read head crosses the trailing edge of the first stripe in FIG. 4. This second transition polarity is ignored. The remaining description of the servo control system will relate to detecting only the positive peaks of the servo read head signal.

Figure 8:
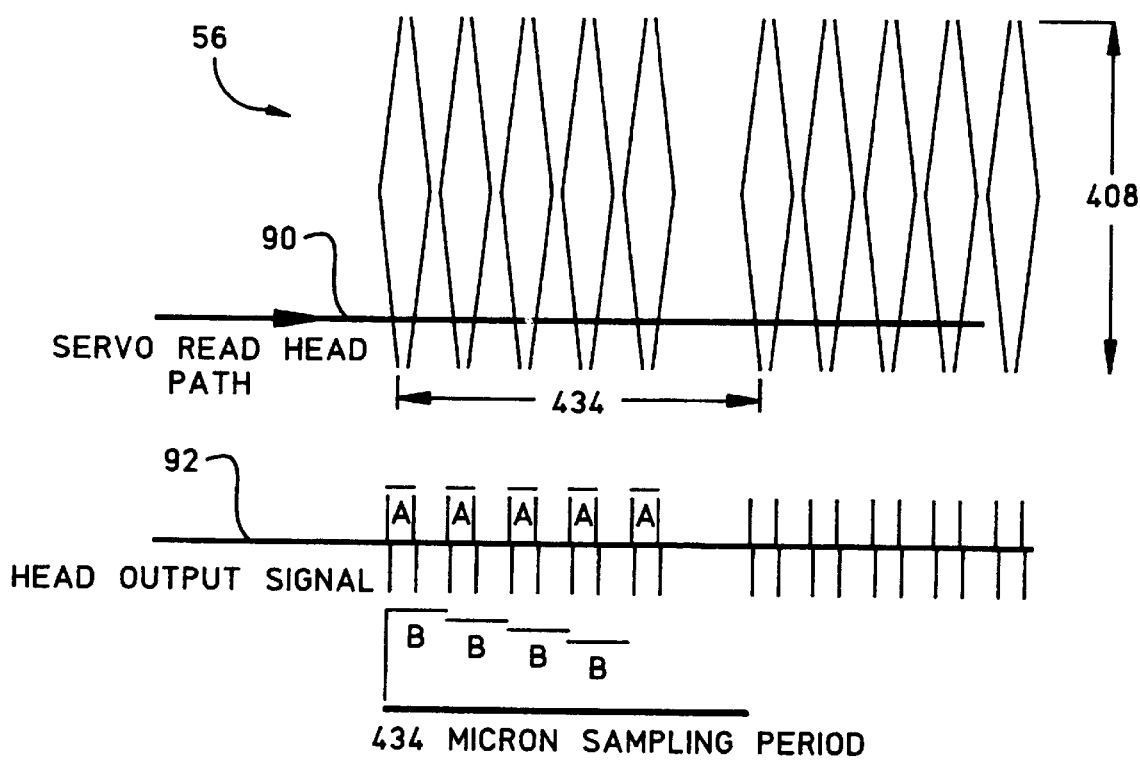
FIG. 8 is a representation of the servo head as it tracks the servo pattern illustrated in FIG. 6 and a graph of the head output signal it generates.

FIG. 8 illustrates the diamond pattern of FIG. 6 showing a path 90 followed by the servo read head and, below it, the corresponding servo read head signal 92 generated by the magnetic servo read head as it crosses the servo pattern stripes, with the A and B intervals indicated. As described above, each successive A interval is referred to as A1, A2, and so on and the B intervals are similarly referred to as B1, B2, and so on. FIG. 8 illustrates that a positive peak is generated for each stripe crossed and defines the pattern intervals, whereas the downward peaks are ignored in determining the timing intervals for generation of the position signal. FIG. 8 indicates that the servo pattern is approximately 408 microns across and 434 microns long.

Figure 9:
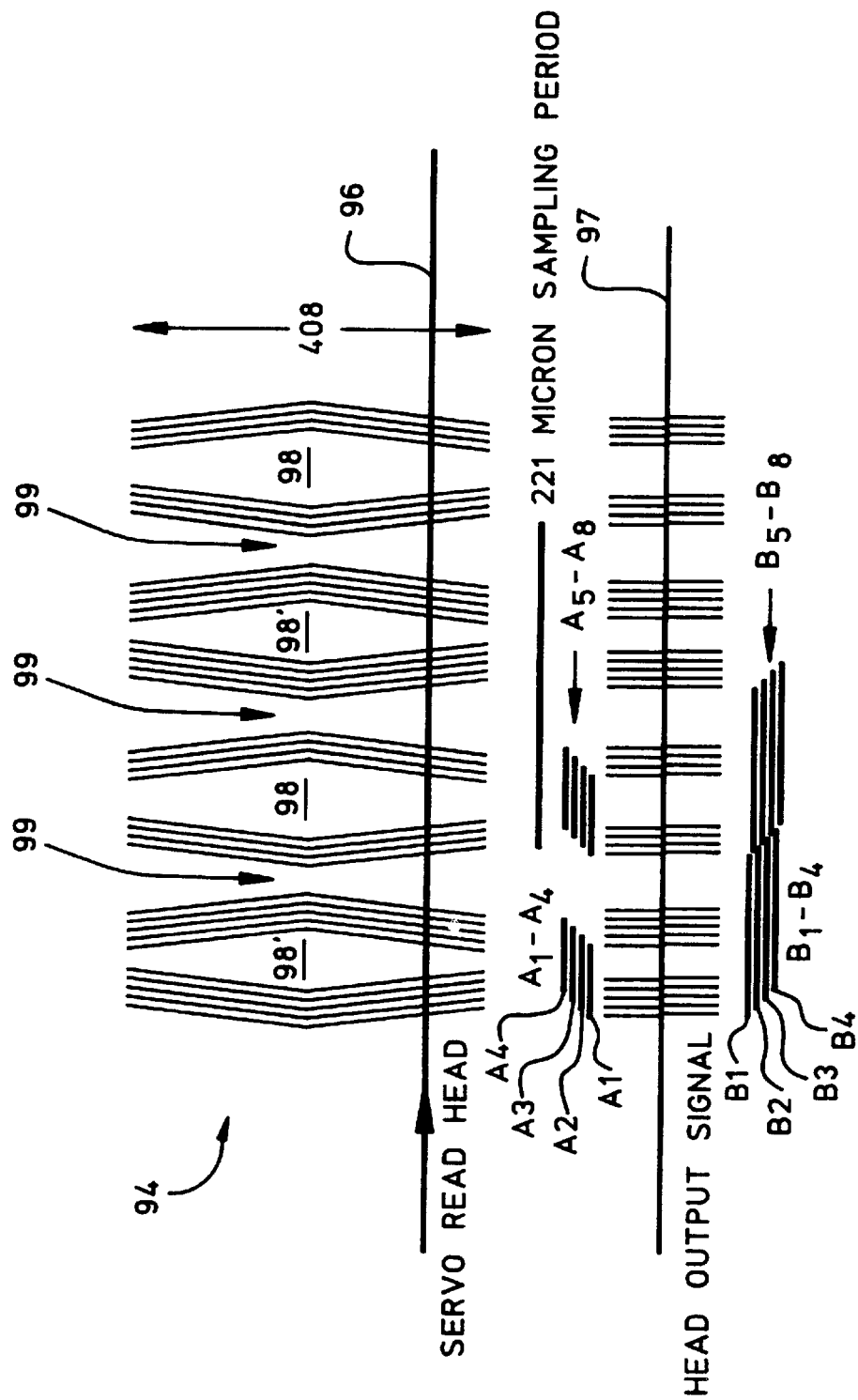
FIG. 9 is a representation of the servo head as it tracks an illustrated fourth alternative servo pattern constructed in accordance with the present invention and a graph of the head output signal it generates.

FIG. 9 shows an alternative nested, or interleaved, diamond pattern 94, with a representation of the path 96 followed by the servo read head, beneath which is a representation of the head output signal 97 generated as the head crosses the servo pattern bands, illustrating the A and B intervals. The interleaved diamond pattern comprises a sequence of five interleaved diamonds, formed by a band of chevron-shaped transitions, which is followed by four interleaved diamonds. This sequence is repeated to form the servo pattern.

The groups of five diamonds and four diamonds illustrated in FIG. 9 are separated by relatively short spacing intervals 99 that are wider at their narrowest point than the maximum separation between any two like stripes within an interleaved group and between any two diamond groups. It also should be apparent that another type of pattern gap having no transitions is located in the FIG. 9 pattern internal to a group of diamonds. These internal gaps 98 can be readily distinguished by control circuitry of the decoder because they occur between a sequence of four diamonds and five diamonds, or between a sequence of five diamonds and four diamonds. In contrast,.the sparing intervals 99 can be recognized because they occur only after two sequences of stripes having an equal number of stripes, such as after two 4-stripe groups or after two 5-stripe groups.

The servo pattern of the preferred embodiment is given by FIG. 9. The dimensions are as follows: The stripe width in the transducing direction is 2.5 $\mu$m. The period of stripes within a group is 5 $\mu$m. The width of the servo pattern perpendicular to the transducing direction is 408 $\mu$m, divided into two symmetric halves of width 204 $\mu$m. The stripes are inclined at an angle of 7.4° relative to a line perpendicular to the transducing direction. In the following dimensions, all lengths are measured from the leading edge of a stripe to a leading edge of another stripe: the spacing interval 99 between diamonds is 10 $\mu$m at the closest approach; the internal gap 98 in a four-diamond group is 15 $\mu$m; the internal gap 98' in a five-diamond group is 10 $\mu$m.

FIG. 9 illustrates that an A interval is defined to extend from a stripe on the left side of a diamond to a corresponding stripe on the right side of the diamond. For example, the first A interval A1 extends from the first stripe of the left side of the first diamond to the first stripe of the right side of the first diamond. The corresponding B interval extends from a stripe on the left side of a diamond to the corresponding stripe on the left side of the next diamond.

The pattern 94 illustrated in FIG. 9 makes maximum use of the track length to generate a position signal. The pattern repeats every 221 microns, thus, the sampling period is only 221 microns long, as compared with the longer sampling periods of the other illustrated servo patterns. Because each interleaved diamond of the FIG. 9 servo pattern contains a predetermined number of stripes, the synchronization feature spacing interval can be detected by counting the number of stripes passed by the servo read head. Grouping the pattern into groups of four diamonds followed by five diamonds permits the decoder to determine the location of the head relative to the track in the transducing direction. More particularly, the decoder can synchronize itself, even if it misses a stripe, because it can expect that, after it receives two bursts of five stripes, it next will receive two bursts of four stripes, then two more bursts of five swipes, and so forth. This advantageously permits a relatively simple error detection and correction scheme to be implemented.

The dimensions of the pattern 94 illustrated in FIG. 9 represent a preferred design which balances three servo requirements: servo pattern width, sample rate, and position signal noise. The pattern width (indicated in FIG. 9 as 408 microns) determines the range of the servo read head signal. This range can be the width of several data tracks (not illustrated). In this embodiment the servo pattern width is equal to approximately eight data track widths so that one servo read element can be used to position a given data read head element over eight different data tracks.

The sample rate of the servo read head signal is determined by the length of the servo pattern and the tape speed. In the preferred embodiment, the servo pattern is 221 microns long. It yields two data points in that space, one at the end of the interval B4 and one at the end of the interval B8. At a typical tape speed of approximately 2.0 m/s, this yields a sample rate of 18,100 samples per second. The sample rate requirement is determined by the rest of the components of the track-following servo loop. If the sample rate is too low, the dynamic response of the loop must be relaxed in order to maintain enough phase margin in the system for adequate control loop stability.

The position signal noise is determined by three factors: the noise in the measurement of the transition interval times, the number of transition interval times measured per sample, and the scaling factor which converts transition interval time to position signal. The noise in the measurement of the transition interval times is governed by such factors as media noise and electronics noise and is largely independent of the pattern dimensions. The noise is considered a constant in this discussion. The number of transitions measured affects the position signal noise because of averaging. In the illustrated FIG. 9 pattern 94, four A- and B-intervals are measured per sample. In the decoder, these four measurements are averaged together to produce the position signal for the sample. Including more stripes and therefore more transitions in the pattern will lower the noise by increasing the averaging, but will also require a longer pattern, which lowers the sample rate. The scaling factor that converts transition interval time to position signal is given by the slope of the stripes.

As the stripe transitions are sloped more azimuthally away from being perpendicular to the servo track centerline, the timing between transitions will vary more with servo head position. These larger timing differences lower the noise in the position signal. Increased slopes, however, also make the servo pattern longer, lowering the sample rate. It should be noted that increased slopes decrease the signal strength from the servo read head because of azimuth loss, which affects the noise in the measurement of the transition times. All of these factors should be considered when determining the optimal servo pattern for a given application. The pattern 94 illustrated in FIG. 9 represents a preferred design, however, different design objectives can be readily addressed by those skilled in the art by adjusting the pattern layout and dimensions.

Figure 10:
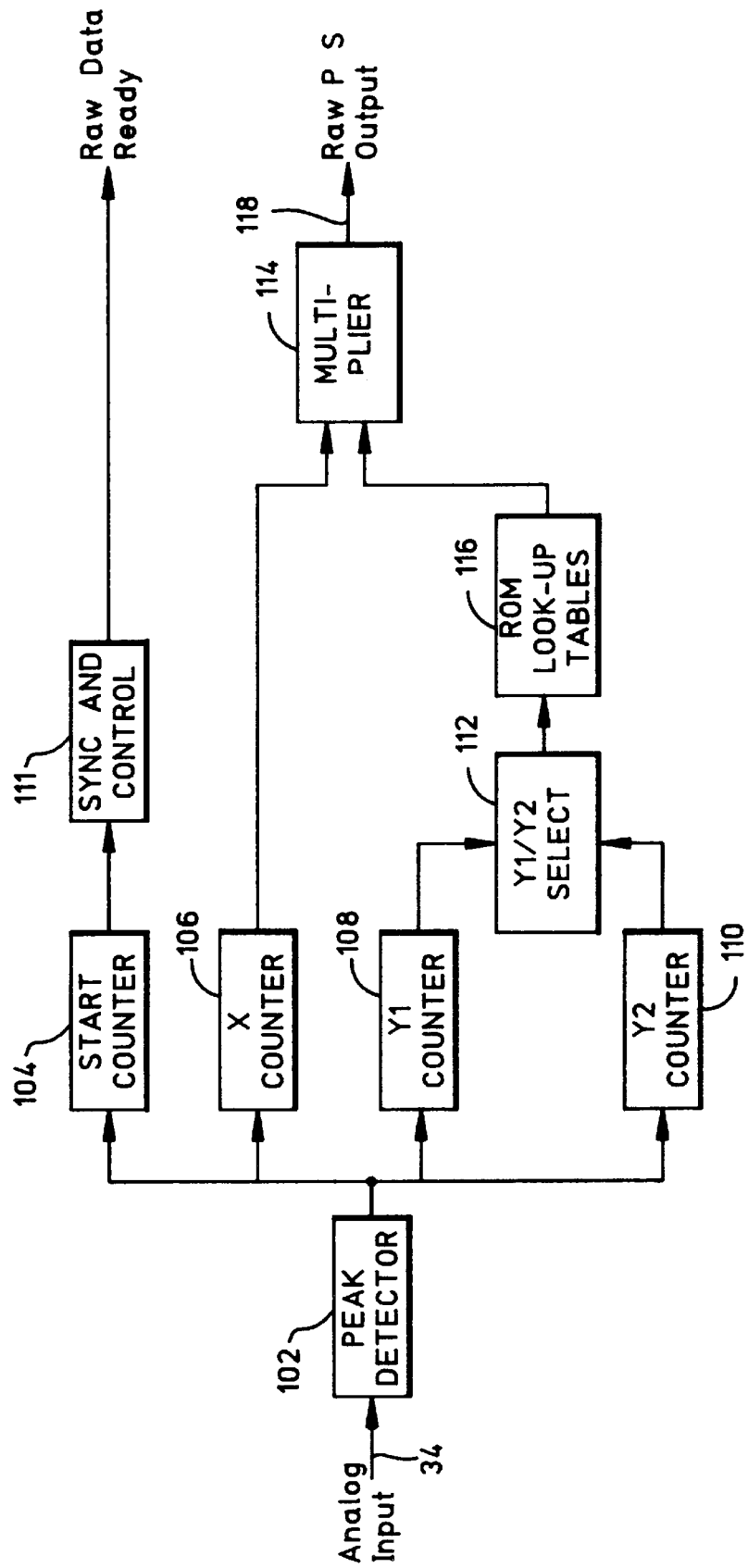
FIGS. 10, 11, and 12 are block diagrams of a position signal decoder for the servo control system illustrated in FIG. 2.
Figure 11:
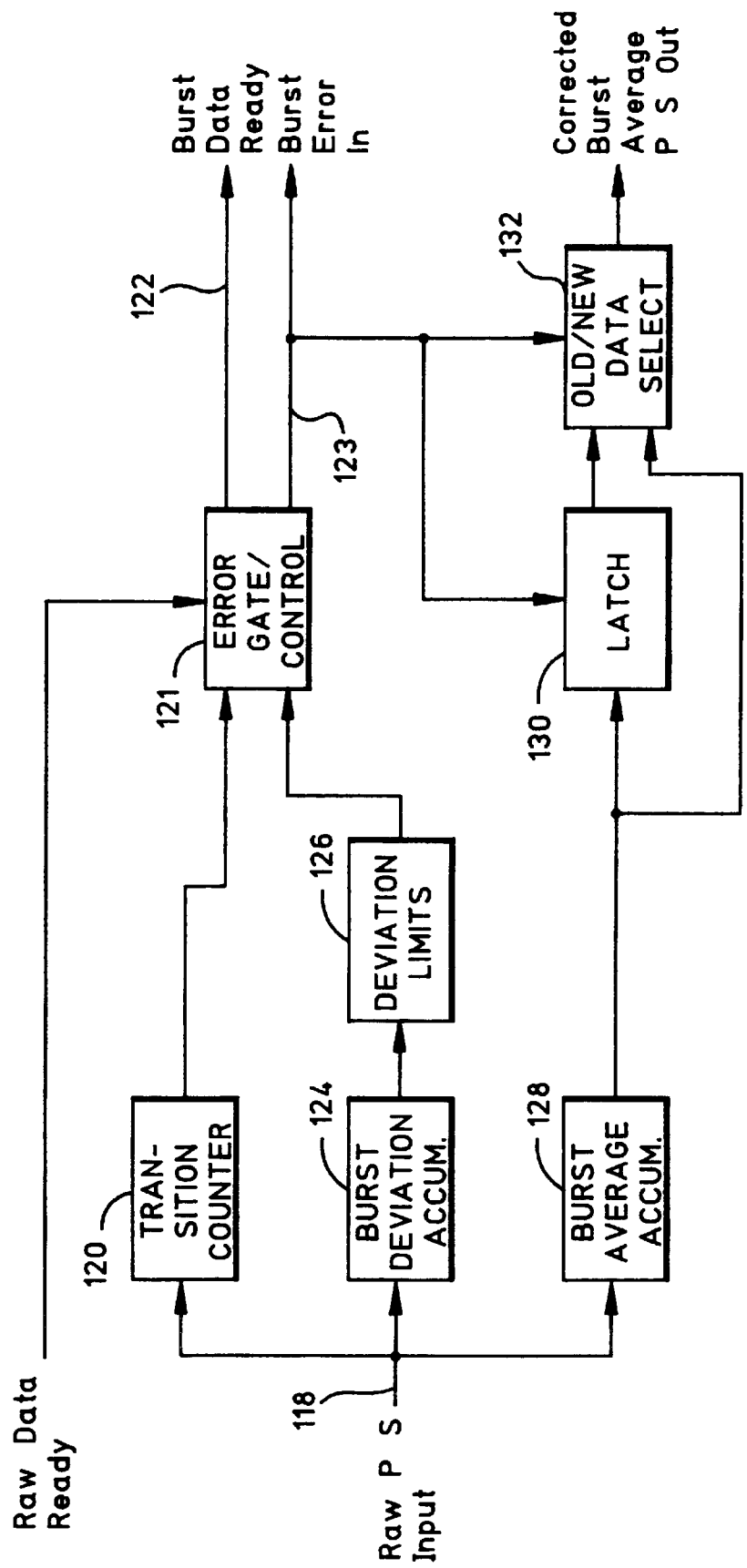
Figure 12:
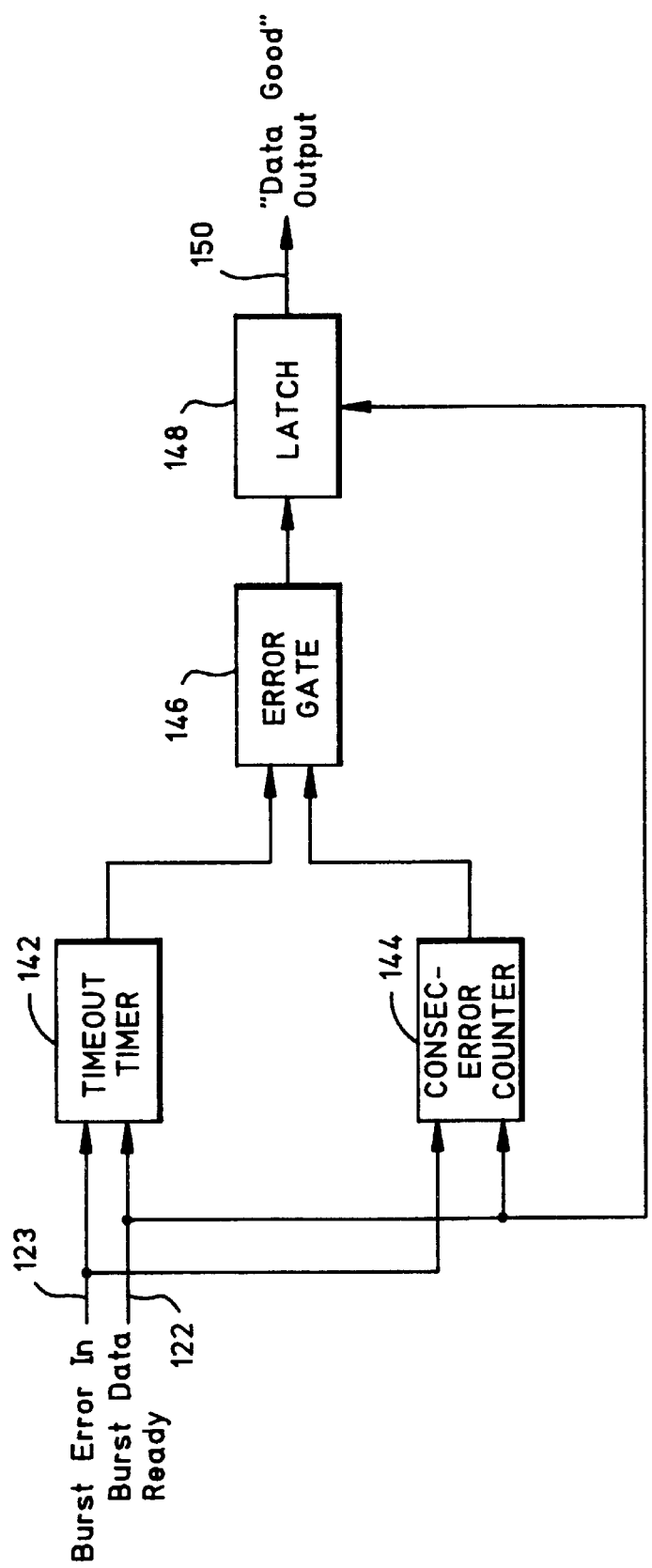

FIGS. 10, 11, and 12 show block diagrams of the signal decoder 36 illustrated in FIG. 2. As described further below, the decoder preferably includes error detection and correction circuitry. Those skilled in the art will appreciate that these two functions can be provided in the same circuit or can be provided by separate circuit modules. FIG. 10 shows that the decoder 36 receives the analog servo read head signal, such as illustrated in FIG. 7, from the servo read head via the line 34 and converts the signal into pulsed logic signals using a peak detector 102. In the preferred embodiment, the output signal from the peak detector goes high on a positive-going transition (leading edge) and goes low on a negative-going transition, permitting the decoder to distinguish between the two polarities.

As noted above, the position signal is decoded by a digital signal decoder 36 (FIG. 2). The function of the decoder is to measure the A and B time intervals and perform the necessary calculations to make the position signal available to the remainder of the servo control system. Additionally, error detection and correction may be applied within the decoder. Those skilled in the art will recognize that while the decoder design and operation must be tailored for the particular servo track pattern used, there are many ways to accomplish the function through various hardware and software approaches. For illustrative purposes, a decoder and error correction circuit is illustrated in FIGS. 10 and 11, for use with simple patterns of the type shown in FIG. 4.

FIG. 7 shows the analog signal derived from a servo read head as a result of reading a pattern as shown in FIG. 4. As shown in FIG. 10, this analog signal is converted to a digital signal by a peak detector 102. The output of the peak detector switches from logic "low" to logic "high" upon detection of positive peaks, and from "high" to "low" at negative peaks. The decoder is designed to trigger the timing of all intervals from only one polarity of peaks, which correspond to a single polarity of magnetic transition, as discussed previously.

In the decoder, a number of counters serve as timers for synchronization and interval timing purposes. A start counter 104 detects start gaps 70 (see FIG. 4) by looking for transition-free intervals longer than the maximum allowed within a burst. When a start gap is detected, synchronization and control circuits 111 are reset to begin decoding a new burst. As each peak in the servo pattern is encountered, the appropriate counters are enabled and reset to time the appropriate A and B intervals. A single "X" counter 106 times. each A interval. Because consecutive B intervals are contiguous, and a finite time is required to output a counter total and reset a counter, two "Y" counters Y1 108 and Y2 110 alternate in timing the B intervals. The desired position signal is the ratio of A and B, which is calculated in this example circuit as follows: Because full digital division requires extensive circuitry, it is advantageous to use a multiplier in combination with a ROM look-up table when the expected range of B values is small (assuming tape speed varies over a limited range). The B value (output of one of the two Y counters) is selected by a Y1/Y2 counter selector 112 and is converted to a 1/B value by a ROM table 116, whose output is multiplied by A in a multiplier 114. Thus, the raw position signal 118 comprises the value A/B at the completion of each pair of A and B values (eight times in each burst).

FIG. 11 shows a block diagram of a practical error detection and correction circuit to accompany the decoder shown in FIG. 10. The illustrated circuitry performs error checking on each burst, and outputs a single position signal value for each burst. In the event no error is found, the burst output is the average value of the eight individual A/B values found within the burst. If an error is detected, a simple scheme is used to replace the current false burst output value with the most recent error-free value. These functions are accomplished as follows: A transition counter 120 counts the number of transitions occurring in each burst. Experimentally it has been determined that most errors involve accidental detection of an extra transition, or failure to detect a legitimate transition, due to noise, dropouts, debris, or other causes. When such errors occur, the transition counter 120 will count a number of transitions per burst other than the correct number (eighteen in this example), and will output 2# an error signal. Additional error detection is accomplished by comparing the successive values of the eight A/B values generated within teach burst. A deviation accumulator 124 sums four of the eight A/B values, and subtracts the remaining four, giving a deviation result that indicates the degree of inequality of the eight values. If this deviation value exceeds certain preset boundaries, a deviation limits detector 126 produces an error signal. These error signal are processed by an error gate/control logic 121. When no error is detected, the logic produces a burst data ready signal on a line 122 that pulses to indicate the availability of good burst data from a burst average accumulator 128. If an error is detected,.the new burst average data is rejected, and replaced with the most recent error-free value. This is accomplished with a latch 130 that causes the last good burst average value from the accumulator 128 to be provided to a data selector 132. A burst error line 123 indicates whether the current output value is a new error-free value or a previous held value.

The servo control system makes use of the burst error line 123 and the burst data ready line 122 to determine whether the position signal integrity is sufficient for adequate servo control operation. For example, the system may reject position data after a certain number of consecutive errors are detected, or after a predetermined time interval is exceeded without new error-free data. When such error conditions occur, the system may choose to accept position signal data from another redundant servo track or, if no servo tracks are producing error-free data, the system may prevent data writing, so as to avoid possibly writing new data off-track and accidentally erasing desired data on adjacent tracks. Such an arrangement is illustrated in FIG. 12.

The circuitry illustrated in FIG. 11 can accomplish error correction merely by substituting the most recent error-free value whenever an error is detected. Those skilled in the art will recognize that other algorithms, such as substitution of an estimated current value, may offer certain advantages for the servo control system.

FIG. 12 shows a block diagram of a discriminator circuit 140 that determines whether the burst data signal should be considered valid or invalid. The burst data ready signal is received over the line 122 by a time-out timer 142 and a consecutive error counter 144. Burst error determinations are received from an error gate/control such as that illustrated in FIG. 11. If the time-out timer 142 does not receive an error-free servo burst signal during a predetermined time interval, then the time-out timer provides an error signal to an error gate 146. If the consecutive error counter 144 counts a predetermined number of consecutive bursts having an error, then it provides an error indication to the error gate. If neither the time-out timer nor the consecutive error counter indicate an error to the error gate, then the decoded signal is considered valid. A latch 148 then sets a data valid signal 150 to a high level, indicating a valid output.

The decoder described in connection with FIGS. 10–12 is a relatively simple case that illustrates the principles of timing-based servo pattern decoding and error detection and correction. The preferred embodiment of the invention uses the interleaved pattern shown in FIG. 9, which has been optimized for a combination of wide servo track width, high signal-to-noise ration, high sampling rate, and good error detection capability.

The preferred embodiment of a signal decoder constructed in accordance with the present invention is illustrated in block diagram form in FIGS. 13–16. FIG. 17 shows the path of a servo read head over a portion of the servo pattern from FIG. 9 along with the resulting analog signal received by the servo read head and the A and B intervals to be timed. The pattern consists of alternating bursts of four and five interleaved diamonds, separated by start gaps that exceed, at their narrowest points, the length of any gaps encountered within bursts. This combination of alternating groups of four and five stripes separated by recognizable gaps provides periodic synchronization information for the decoder. Because the intervals to be timed are interleaved and, in the case of B intervals, are contiguous, the decoder is divided into two subdecoders indicated by a suffix of "1" or "2" that alternate in producing position signal information, each outputting every other position signal value. Each of these subdecoders times four A and four B intervals, which are shown in FIG. 17. The timing is points labeled CLR1, CLR2, OUT1, and OUT2 in FIG. 17 indicate the time points when each subdecoder is cleared and when each produces a position signal value. The main circuitry of the subdecoders, including interval timing circuitry and error detection circuitry, is shown in FIGS. 13–16. The circuitry shown includes error detection, but does not include error correction; this is assumed to be handled by the servo controller, using principles similar to those discussed above. Likewise, the quotient A/B is not calculated in this decoder; the servo controller performs this function. The details of such circuitry can be readily determined by those skilled in the art, in conjunction with this description.

While the interleaved A and B intervals could be timed with individual dedicated counters, the same function may be performed by a single accumulator in each subdecoder. For example, the timing of A values in the first subdecoder is accomplished as follows: An X1 accumulator is initially cleared (by CLR1) to a zero value. A transition counter TC1 keeps track of the head location within the servo pattern (determined by how many stripes have been crossed). When the location in the pattern is outside of the A intervals, an XI increment ROM produces a value of zero to the X1 accumulator, holding its value at zero. At other points in time, the transition counter TC1 and increment ROM X1 provide to the X1 accumulator an increment value equal to the number of A intervals currently being timed. The X accumulator adds this number to its total on each clock cycle. In this way, the X1 accumulator serves the role of multiple parallel timers.

It should be noted that the X1 accumulator contains the sum of four A values after the intervals are complete; this is the desired A output value for the burst group. In a similar manner as described above, a Y1 accumulator sums the four B intervals. A deviation accumulator D1 alternately adds and subtracts both the A and B intervals in a manner such that its sum is zero if all A intervals have equal length and all B intervals have equal length. The extent to which these equalities do not hold causes the sum in the D1 accumulator to deviate from zero. Comparators labelled DEV MAX and DEV MIN determine whether the deviation has exceeded predetermined boundaries, which indicate an error condition. Error checking also includes transition counting, which is accomplished by two magnitude comparators 1 and 2. Because the total number of transitions expected is different (either 13 or 14) for each subdecoder, separate counters and magnitude checkers are provided for each. Selection of which subdecoder is currently in use is determined by the SELECT signal. This signal, as well as others depicted in FIG. 13, will be described in conjunction with FIGS. 14–16.

Figure 13:
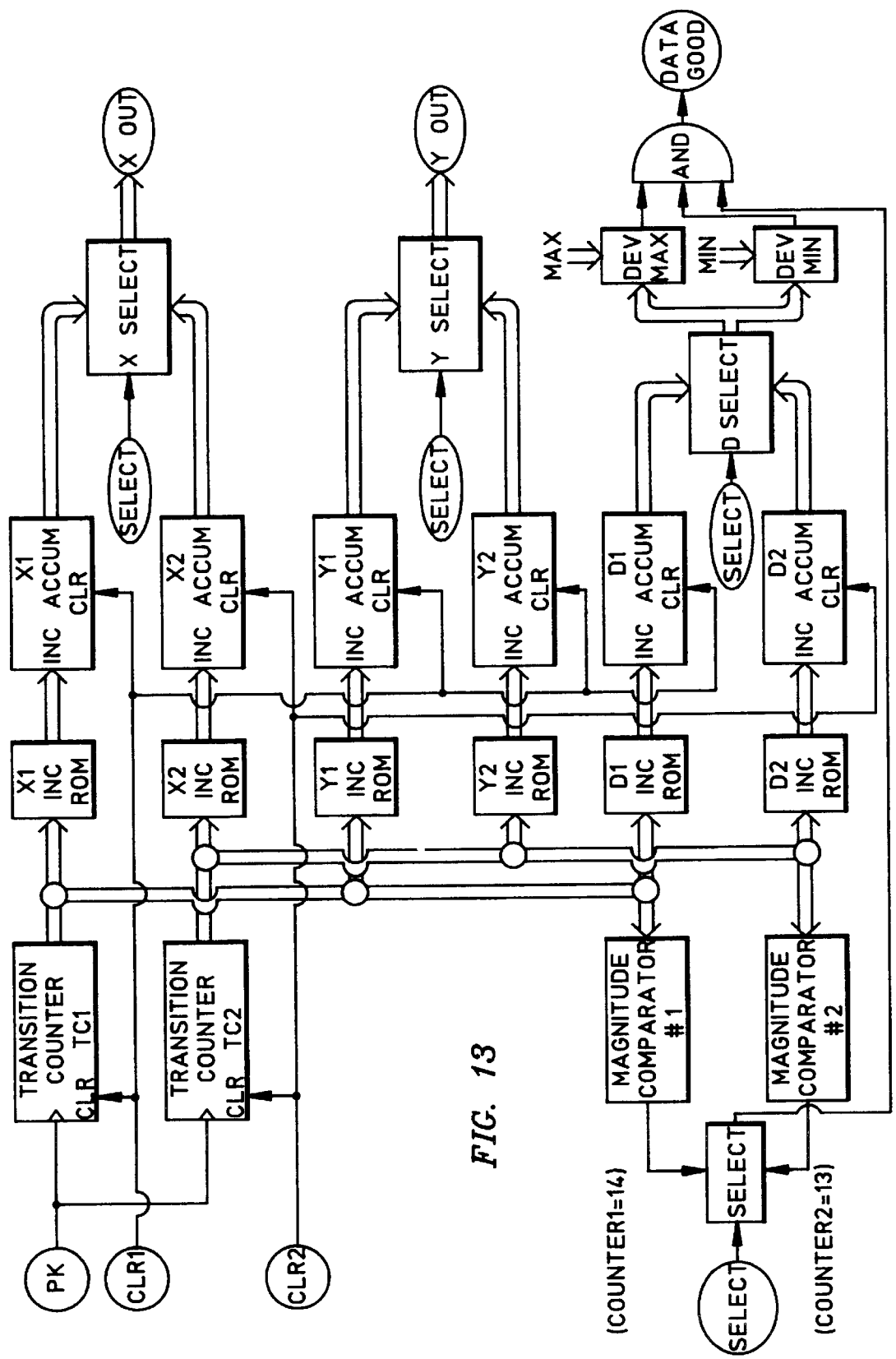
FIGS. 13, 14, 15, and 16 are block diagrams of an alternate position signal decoder for the servo control system illustrated in FIG. 2.
Figure 16:
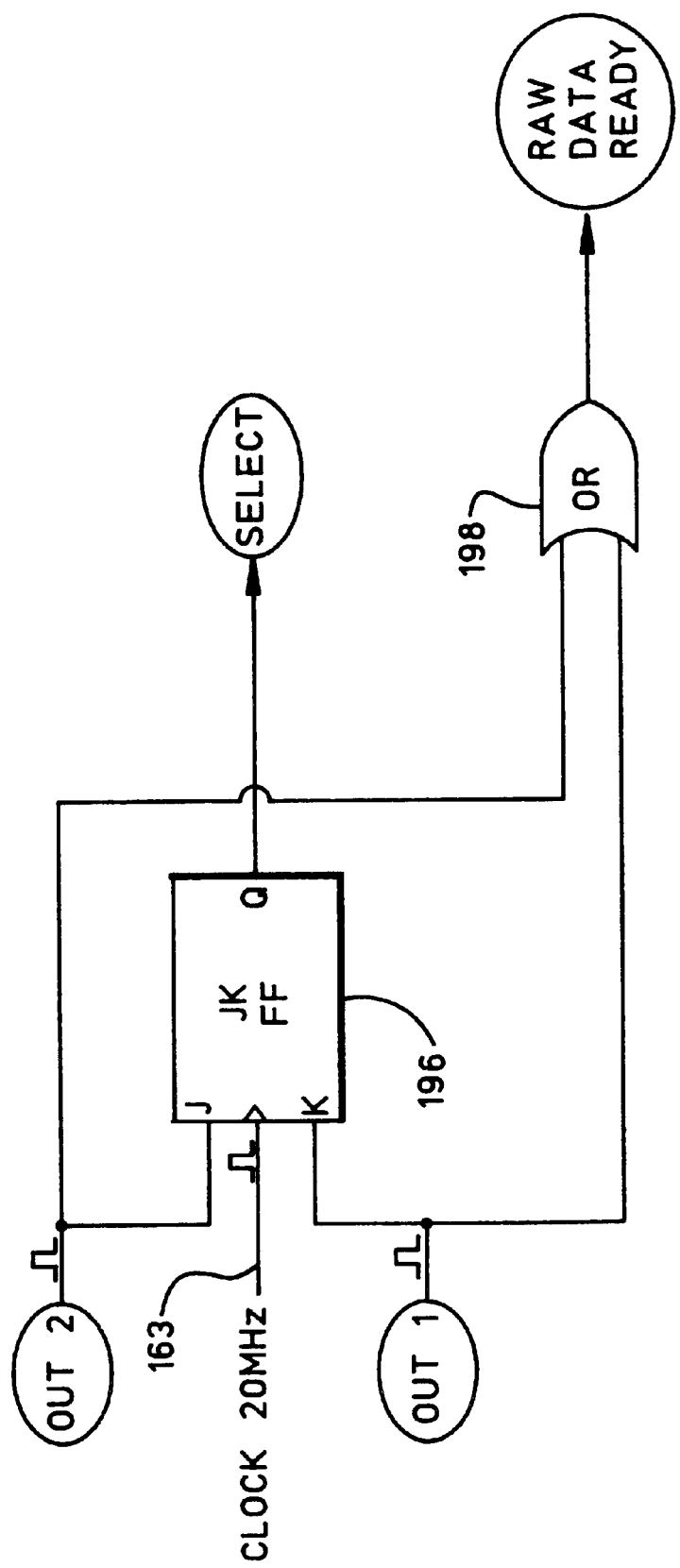
Figure 17:
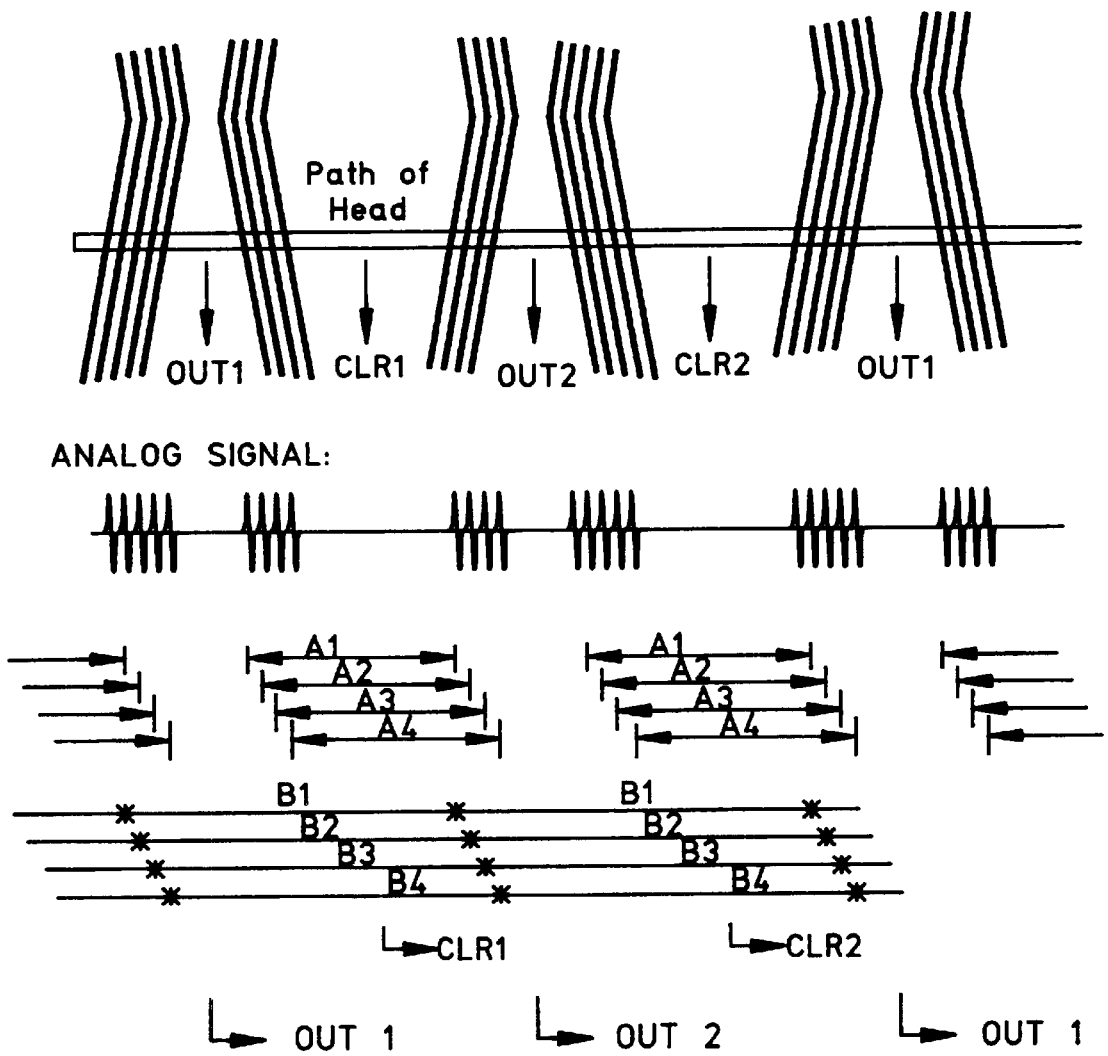
FIG. 17 is a representation of the servo head as it tracks the servo pattern illustrated in FIG. 9, along with a representation of the head output signal it generates and the corresponding A and B signal intervals.

The DATA GOOD signal shown in FIG. 13 indicates whether an error condition has been detected either by the transition counters TC1, TC2 or the deviation limit circuits DEV MAX and DEV MIN for the values currently being produced on XOUT and YOUT data lines at the time of a DATA READY pulse (FIG. 16). The state of the DATA GOOD line is used by the servo controller for error correction purposes.

Figure 14:
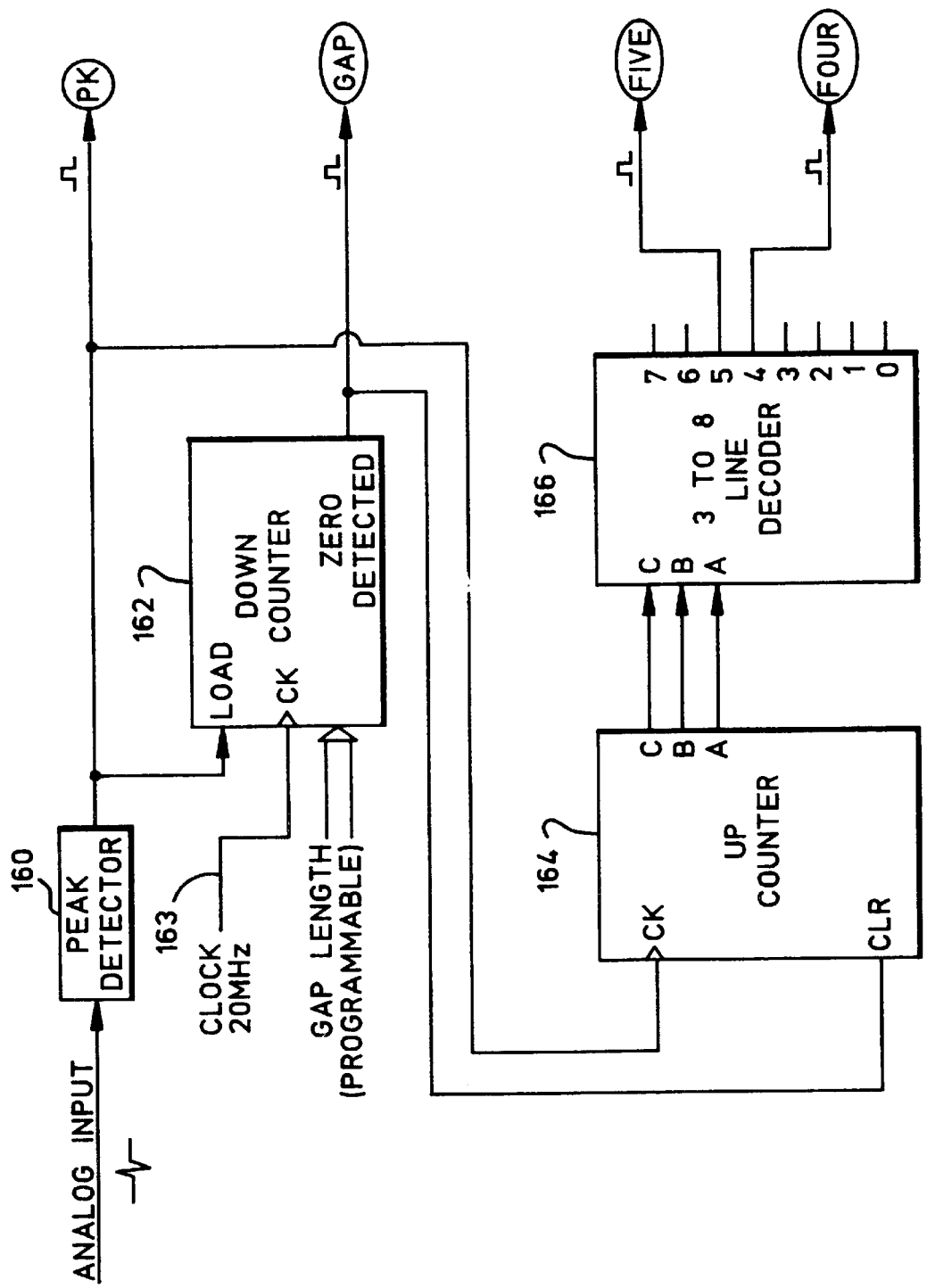

FIG. 14 illustrates the generation of the PK signal as well as three other intermediate signals, namely, a GAP, FOUR, and FIVE signal. The PK signal is generated by a conventional peak detector 160 that typically is used in magnetic disk or tape drives to convert an analog signal into digital pulses. The peak detector 160 differs slightly from those used in most conventional drives in that it produces a pulse only on positive-going peaks. Typical peak detectors used in magnetic drives usually produce a pulse on both positive-going and negative-going peaks. The peak detector 160 used in the preferred embodiment should be well-known to those skilled in the art and needs no further explanation.

The output of the peak detector comprises the PK signal, which is provided to the circuitry illustrated in FIG. 13 and also is provided to a down counter 162. The down counter also receives a clock signal 163 from a system clock and receives a GAP length signal, which can be set by a user to a predetermined value, for example, corresponding to the separation between stripes in a diamond of FIG. 9. A GAP signal comprises a pulse generated by the down counter whenever a time interval is detected beyond a predetermined gap length without a pulse from the peak detector 160. That is, the down counter times out, or counts down to zero, if no PK pulse is detected after the gap length amount of time. For a given tape speed and servo pattern size, a suitable gap time limit is chosen. In the preferred embodiment, the tape speed is approximately 2.0 meters per second and the pattern comprises groups of four and five stripes 5 $\mu$m apart, and the preferred time limit is selected to be 3.75 msec. As a result, the generated GAP signal comprises a pulse at each gap between the groups of four and five servo pattern stripes. As noted above, the spacing intervals 99 (FIG. 9) can be readily distinguished from the internal pattern gaps 98 based on keeping track of the number of diamond stripes encountered. This is described further below.

The PK signal and the GAP signal are used to produce the FOUR and FIVE signals, respectively. The FOUR signal goes high whenever four servo pattern stripes are detected after a pattern gap. The FIVE signal goes high whenever five servo pattern stripes are detected after a gap. An up counter 164 receives the PK signal at a clock input and receives the GAP signal at a clear input. The up counter provides its counting output to the input lines of a 3-to-8 line decoder 166. In a manner well-known to those skilled in the art, the 3-to-8 line decoder produces the FOUR and FIVE pulse signals.

Figure 15:
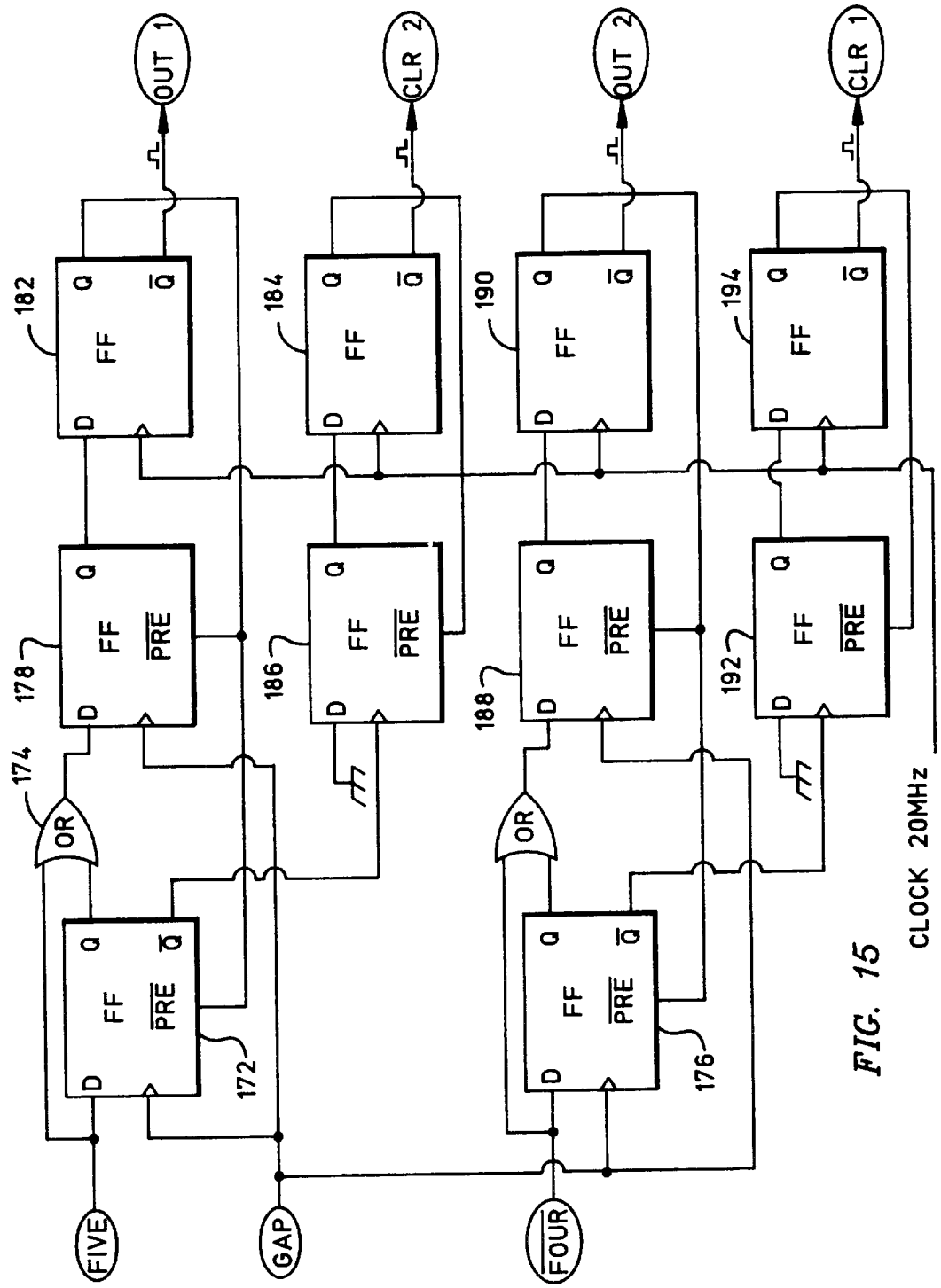

FIG. 15 shows how the FOUR, FIVE, and GAP signals are used to produce the main control signals OUT1, OUT2, CLR1, and CLR2. For the pattern illustrated in FIG. 9, the OUT1 and OUT2 signals are generated at every spacing interval 99, whereas the CLR1 and CLR2 signals are generated at the internal gaps 98. An array of flip-flops are used in conjunction with two OR gates to produce the control signals. The GAP signal is provided to the clock input of the four flip-flops 172, 176, 178, 188. The inverse FIVE signal is provided to the first flip-flop 172 and to an OR gate 174. The OUT1 signal produces a single pulse whenever a gap is detected after two FIVE pulses. Thus, the Q output of the first flipflop 172 is provided to the other input of the OR gate 174, whose output is provided to the D-input line of a third flip-flop 178, and the inverse Q output of the first flip-flop 172 is provided as the clock input to a fourth flip-flop 180. The D-input of the fourth flip-flop is grounded. A fifth flip-flop 182 receives the Q output signal from the third flip-flop 178 and also receives a system clock signal at its clock input. The fifth flip-flop produces the OUT1 signal from its inverse Q output line.

The CLR2 line produces a single pulse whenever a GAP signal is detected after exactly one FIVE signal pulse. Thus, the Q output from the fourth flip-flop 180 is received at the D-input line of a sixth flip-flop 184, which also receives the system clock signal at its clock input. The inverse Q output of the sixth flip-flop provides the CLR2 signal.

The OUT2 signal line produces a signal pulse when a GAP signal occurs after two FOUR signals, while the CLR1 line produces a signal pulse when a GAP signal occurs after exactly one FOUR signal. As illustrated in FIG. 15, this can be provided by connecting the inverted FOUR signal to one input of an OR gate 186 and also to the D-input of the second flip-flop 176. The output Q of the second flip-flop 176 is provided to the other input line of the OR gate 186. The output of the OR gate is provided as the D-input to a seventh flip-flop 188. The GAP signal is provided as the clock input to the seventh flip-flop. The Q output of the seventh flip-flop 188 is provided as the D-input to a ninth flip-flop 190. The ninth flip-flop receives the system clock signal at its clock input line. The inverted Q output from the ninth flip-flop 190 produces the OUT2 signal.

The CLR1 signal is produced by a ninth flip-flop 192 whose D-input is grounded and whose clock input is received from the inverted Q input of the second flip-flop 176. The Q output of the ninth flip-flop is provided to the D-input of a tenth flip-flop 194. The tenth flip-flop receives the system clock signal at its clock input line. The inverted Q input of the tenth flip-flop 194 comprises the CLR1 signal.

FIG. 16 illustrates how a SELECT signal is generated and how a data-ready (DR) signal is generated. Whenever an OUT1 or OUT2 signal pulse occurs, data is ready to be output. That is, the servo head is at the end of one diamond pattern, either a group of four interleaved diamonds or a group of five interleaved diamonds. The SELECT signal is used to select the proper registers and data ready pulses. The SELECT signal is produced from a J-K flip-flop 196 with its J input line connected to the OUT2 signal and its K input line connected to the OUT1 signal. The clock input of the J-K flip-flop is connected to the system clock signal. The Q output of the J-K flip-flop 196 produces the SELECT signal. The OUT1 and OUT2 signals are connected to the input lines of an OR gate 198, whose output produces the data-ready (DR) signal.

The generation of the position signal relative to the interleaved diamond pattern illustrated in FIG. 9 will be better understood with reference to the following drawings: FIG. 13, the logic circuit that illustrates the generation of the position signal signals; FIG. 17, the representation of the interleaved diamond pattern and output signal; and FIG. 18, a chart illustrating the generation of the output signals and clear signals. As indicated in FIG. 13, the position signal comprises alternating values designated XOUT and YOUT. As noted above, FIG. 13 shows that there are two completely redundant signal generation systems, identified by a "1" suffix and "2" suffix, which take turns producing the XOUT and YOUT values. Thus, one XOUT value is generated by the X1 elements, followed by a YOUT value generated by the Y1 elements, followed by a next XOUT value from the X2 elements, a next YOUT value from the Y2 elements, a next XOUT value from the X1 elements, and so forth. The sequence of values comprises the position signal. The description of the circuit operation initially will refer only to the first of the redundant signal generation systems, indicated by a "1" suffix.

The position signal is the sum of four A-interval values divided by the sum of four B-interval values described above in connection with FIGS. 4–6 and FIGS. 8 and 9. The accumulators X1, X2, Y1, and Y2 shown in FIG. 13 can perform the division, or multiplication by reciprocals, of the A and B values and then add the quotients, or can calculate the sums and then perform the division operation, to generate the XOUT and YOUT values. The A intervals and B intervals are graphically represented in FIG. 17.

FIG. 17 shows that the A intervals A1, A2, A3, and A4 overlap one another in time, as do the corresponding B intervals B1, B2, B3, and B4. A separate counter could be used S to time each A and B interval; however, this approach would require eight counters. As noted above, in the preferred embodiment, the summation is instead achieved using two parallel signal generation systems having paired accumulators. As illustrated in FIG. 13, the first signal generation system includes two paired accumulators X1 and Y1, while the second signal generation system includes two accumulators X2 and Y2. Each accumulator has input lines for "clear" and "increment", and it should be understood that each also receives a clock input (not illustrated). With each clock cycle, the accumulator adds the amount of the increment obtained from an increment ROM (labeled "INC ROM") to the data output signal. Each accumulator adds an increment of zero, one, two, three, or four, depending on the servo pattern band just crossed by the servo head. A pulse on the respective signal generation system clear line (CLR1 or CLR2) resets the accumulator output to zero. The accumulators get their increment instruction, the amount to add with each clock cycle, from the increment ROMs. The increment ROMs, in turn, are addressed by transition counters TC1 and TC2.

In operation, when a CLR1 pulse occurs, the first transition counter TC1 resets to zero and its associated accumulators X1, Y1, and D1 also are reset to zero. As the servo head moves along the servo pattern after the CLR1 pulse, as illustrated in FIG. 17, it crosses a group of four servo pattern stripes, then crosses two groups of five stripes. The transition counters count peak (PK) pulses to keep track of how many servo pattern stripes have been crossed. On the first PK pulse after the CLR1 signal is received, the system begins timing the first B interval. On the second PK pulse, the second B interval timing begins, and so on. On the sixth PK pulse after the CLR1 signal, the first A interval timing begins. On the seventh PK pulse, the second A interval timing begins. This continues such that, on the eleventh PK pulse after the CLR1 signal, representing the eleventh servo pattern stripe crossed, the first A interval and the first B interval timing end. On the fourteenth PK pulse after the CLR1, all A and B intervals have ended and the sums are ready to be output. The fourteenth servo pattern stripe, after a pair of five-stripe groups, is when the OUT1 pulse occurs, producing an output value (FIG. 15).

The accumulators, using the increment data in the increment ROMs, automatically add up the intervals as needed. FIG. 18 shows the increment data that is stored in the respective increment ROMs. In FIG. 18, the ADDRESS column is the transition counter output value that indicates which servo pattern stripe after the associated CLR1 or CLR2 signal has just been crossed. The columns X1, X2, . . . , D2 show what increment values will be added to each respective accumulator of FIG. 13 for each clock cycle. It should be noted that the address refers to the number of PK pulses following the corresponding clear signal. Thus, the increment values in the X1 column are indexed according to the number of PK pulses received after a CLR1 signal, while the increment values in the X2 column are indexed according to PK pulses after a CLR2 signal.

The operation of the X1 accumulator next will be described in greater detail. The other accumulators operate in a similar manner. From FIG. 17, it should be clear that the sixth servo pattern stripe crossed after a CLR1 signal starts the timing of the first A interval for a five-stripe diamond. This can be seen from examination of the servo pattern stripes, the head output analog signal, and the second group of A intervals. Thus, the transition counter TC1 output value that is produced from counting PK pulses is equal to six and the corresponding increment ROM address is equal to six. From FIG. 18, the amount of increment to the X1 accumulator is one.

On the seventh PK pulse following a CLR1 signal, the first A interval continues to be timed while the second A interval timing begins. Therefore, after the seventh PK pulse indicating the crossing of the seventh servo pattern stripe, the ROM address is seven and from FIG. 18 it is clear that the accumulator X1 increments two on each clock cycle. Similarly, after the eighth servo pattern stripe is crossed, three A intervals A1, A2, and A3 are simultaneously timed, so the accumulator is incremented by three on each clock cycle. On the ninth servo pattern stripe, the accumulator is incremented by four. On the eleventh servo pattern stripe, the first A interval A1 has ended, and therefore only three intervals continue to be timed. Therefore, the increment to the X1 accumulator is reduced to three, as indicated in the FIG. 18 table entry for ROM address eleven. After the fourteenth servo pattern stripe, all A intervals are completed and therefore the accumulator increment is changed to zero. That is, the accumulator already contains the sum of the four A intervals and the output value is ready to be produced, after an OUT1 pulse occurs. Similarly, the Y1 accumulator will have been timing the B intervals and also has its data ready to be output.

The set of accumulators X2 and Y2 of the second signal generation system operate in the same way, starting from the CLR2 signal and completing in time for the OUT2 pulse (FIG. 15). Thus, the sixth servo pattern stripe crossed after a CLR2 signal corresponds to the first servo pattern stripe of a four-diamond group. Therefore, the A1 interval for the second signal generation group begins and the X2 accumulator should be incremented by one. This is shown by the corresponding value in the FIG. 18 table for ROM address six of the X2 column. At a tape speed of approximately 2.0 meters per second, the combination of the two sets of accumulators provides new position signal data at a rate of approximately 18 kHz.

FIG. 13 shows that the outputs of the accumulators are routed through respective selectors X-SELECT, Y-SELECT, and D-SELECT that choose which of the two signal generation systems has the current output value that should be output. The selection is governed by the SELECT data signal, described above in conjunction with FIG. 16. After an OUT1 pulse, the set of accumulators from the second signal generation system becomes active, and after an OUT2 pulse, the set of accumulators from the first signal generation system becomes active. Thus, for the interleaved diamond servo pattern illustrated in FIG. 17, the first set of accumulators X1, Y1, D1 becomes active after an OUT2 pulse, which occurs after two four-stripe groups, while the second set of accumulators X2, Y2, D2 becomes active after an OUT1 pulse, which occurs after two five-stripe groups.

In the preferred embodiment illustrated in FIG. 14, error checking is performed to detect missing or extra transitions and to detect servo pattern stripes that are erroneously read in a slightly shifted position. Details of error correction that can be performed after error detection are not illustrated in FIG. 14 but those skilled in the art will readily be able to construct such circuitry, in view of the discussion above concerning FIGS. 10–12. In FIG. 13, missing or extra detected stripes are detected by the transition counters TC1 and TC2 that count every PK pulse. When an output signal pulse OUT1 or OUT2 occurs, magnitude comparators check to see if the correct number of transitions (either 13 or 14, as indicated) have been detected. For example, in the case of the first set of accumulators, the predetermined number of transitions is fourteen whereas for the second set of accumulators, the predetermined number is thirteen. If a number other than the predetermined number is detected, then the data-good (DG) signal produced by the SELECT block will be false. The system decoder 36 (FIG. 2) detects the DG signal and thereby is warned that the data is bad and takes predetermined corrective action. In the preferred embodiment, for example, the corrective action comprises maintaining the output signal at its previous value.

If the PK pulse from one servo pattern stripe is accidentally shifted in time, then all A interval values and B interval values will not have the same value. The system illustrated in FIG. 13 provides deviation accumulators D1 and D2 that add and subtract the individual A and B intervals in a way that should provide a zero result. If any servo pattern stripe is shifted in time, the result will be non-zero, either positive or negative. A maximum comparator $DEV_{max}$ and a minimum comparator $DEV_{min}$ check the D1 and D2 deviation accumulator output to permit servo pattern stripe shifts to be larger than a predetermined minimum amount, which permits normal noise within the system to cause acceptably small errors, but does not permit shifts to be larger than a predetermined maximum amount, which indicates an error. If the difference is less than the maximum value and less than or equal to the minimum value, then the output of the corresponding deviation accumulator D1 or D2 goes high and, along with output from the SELECT data signal, produces the data-good (DG) signal. In this way, the deviation check circuitry also prevents random noise from being considered valid output in the event that random noise produces suitable patterns to produce an OUT1 or an OUT2 signal pulse.

The signal decoder and position signal circuitry described above use servo control information that comprises a repeating servo pattern of stripes having magnetic flux transitions that extend continuously across the width of servo information tracks in the translating direction in an azimuthal slope. The signal decoder receives the analog servo read head signal and generates a position signal that is a function of the ratio of two intervals derived from the servo pattern. This provides a servo control system that is independent of tape speed and therefore is insensitive to speed variations. Those skilled in the art will appreciate that a variety of techniques can be used to produce the servo patterns illustrated in FIGS. 4–9 in magnetic storage media, such as magnetic tape. A variety of systems for producing the servo patterns used by the decoder will be described next.

Figure 19:
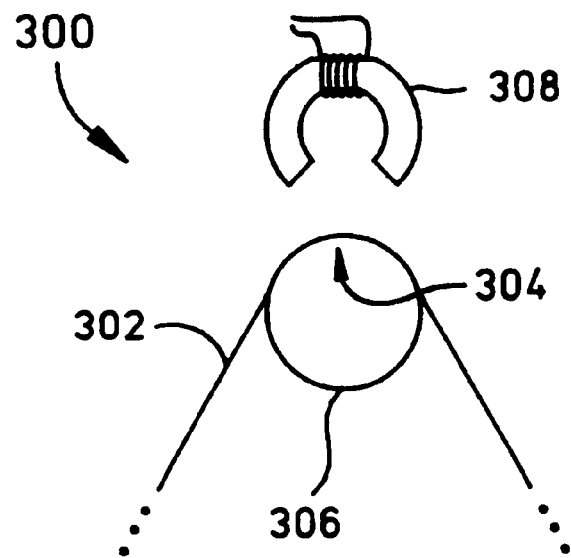
FIG. 19 is a representation of a drum system for recording the servo patterns onto magnetic storage tape.
Figure 20:
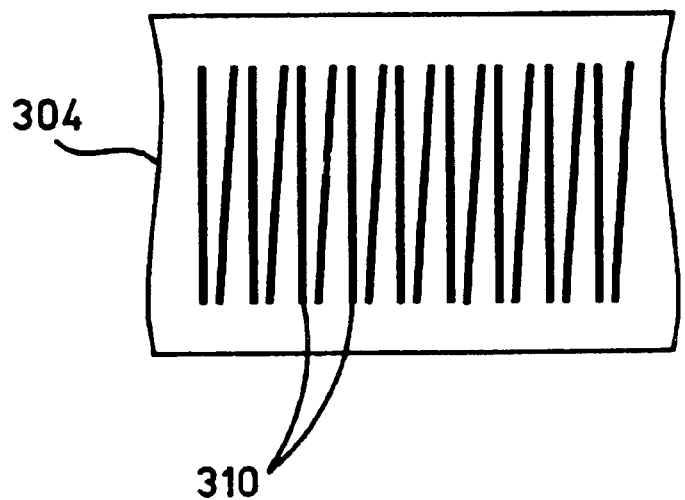
FIG. 20 is a representation of the magnetic flux transitions that can be recorded onto a portion of magnetic tape by the system illustrated in FIG. 19.

FIG. 19 shows a magnetic drum system 300 for producing the servo patterns described above. Magnetic tape 302 onto which the servo patterns are to be recorded is wound around a curved portion of the circumference 304 of a drum 306 such that the curved portion is adjacent an electromagnet 308 on the opposite side of the tape that projects a magnetic field of flux outwardly toward the tape. A sequence of raised bands is deposited onto the circumference of the drum in the desired servo pattern. For example, the bands deposited onto the circumferential portion 304 of the drum illustrated in FIG. 20 produce a servo pattern on the tape 302 that is the same as that illustrated in FIG. 4. Other details of a drum system implementation for producing the servo patterns are well-known to those skilled in the art and do not form part of the invention described herein. See, for example, U.S. Pat. No. 3,869,711 to Bernard.

Those skilled in the art will appreciate that the drum portion 304 shields those lengths of the magnetic tape with which the bands have contact while the external electromagnet 308 projects a magnetic field onto the tape, leaving the desired servo pattern flux transition bands. The drum pattern bands 310 preferably are deposited using photolithographic techniques, as such techniques provide the extreme accuracy needed for accurate reproduction of the servo patterns. Preferably, the bands are constructed of a nickel iron or permalloy material on a nonmagnetic drum.

Figure 21:
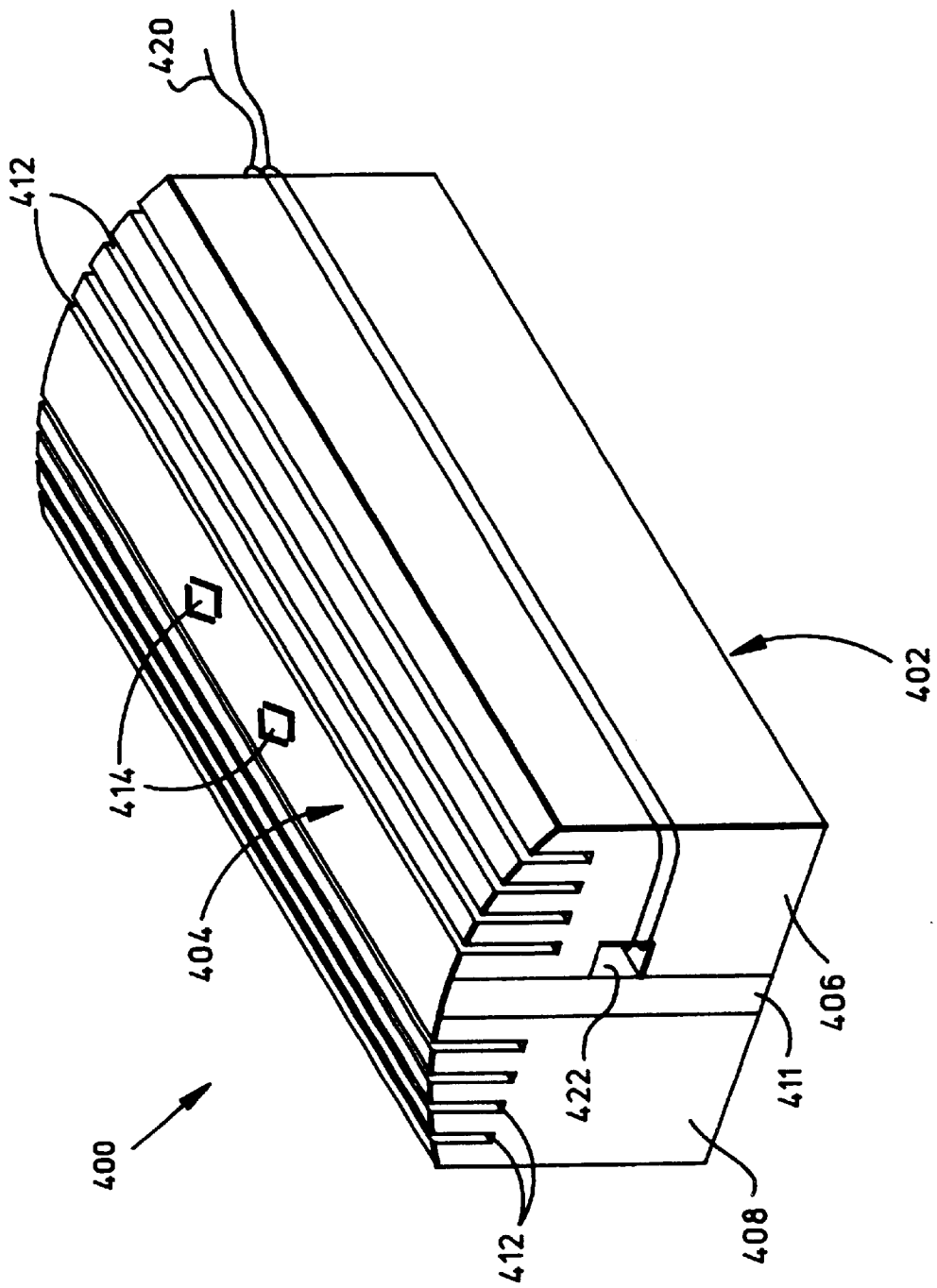
FIG. 21 is a representation of a multi-gap head that can record the servo pattern illustrated in FIG. 9.

A preferred method for producing the patterns is with a multiple gap servo write head. The multiple gap heads of the preferred embodiment are produced from photographic techniques known to those skilled in the art. FIG. 21 shows a multiple gap servo write head 400 constructed in accordance with the present invention. The head illustrated iii FIG. 21 comprises a ferrite ring 402 with a patterned NiFe pole piece region 404. Two ferrite blocks 406, 408 form the bulk of the magnetic head and are separated by a glass spacer 411.

In constructing the head, the ferrite blocks 406, 408 and glass spacer 411 are first bonded together with an epoxy glue or with glass bonding techniques. The resulting structure is then lapped to produce the desired front contour, which comprises the tape bearing surface. In the preferred embodiment, a cylindrical front contour surface is provided. Cross-slots 412 are cut into the head to remove included air when the head is in operation with magnetic tape.

Figure 22:
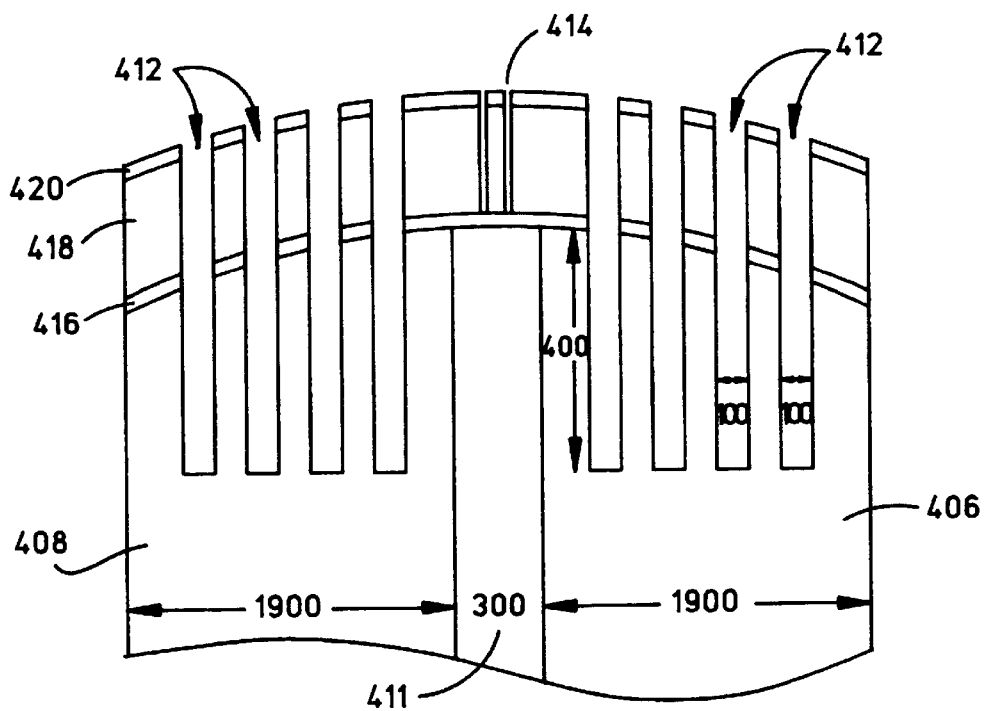
FIG. 22 is a cross-section of the head illustrated in FIG. 21.

As shown in FIG. 22, a conducting seedlayer 416 is then deposited on the front contour surface. In the preferred embodiment, 800 angstroms of NiFe have been used. Photoresist material is then deposited on the front surface and patterned in the shape of the desired servo patterns 414. The patterning of the cylindrical surface can be done by either contact-exposure or projection-exposure techniques familiar to those skilled in the art. Because high resolution is only required for the servo patterns located at the apex of the cylindrical contour, standard planar exposure techniques can be used. In the preferred embodiment, the photoresist lines which define the gap regions are 2 $\mu$m wide and 3.5 $\mu$m tall.

After the desired gap structures are formed in the photoresist, $Ni_{45}Fe_{55}$ material 418 is plated to a thickness of approximately 2 $\mu$m on the seedlayer 416 wherever the photoresist has been removed. The remaining photoresist material is then removed. A wear-resistant overcoat 420 is then deposited over the front contoured surface to protect it. In the preferred embodiment, this overcoat is a laminated NiFeN/FeN structure with a total thickness of approximately 3000 angstroms. Alternative overcoat materials that can be used are, for example, diamond-like carbon or other wear-resistant materials.

Finally, as shown in FIG. 21, a coil 420 is wound around one of the ferrite blocks 408 through a wiring slot 422 to complete the head. The flux through each gap is in the same plane as the lithography. This limits the gap width to the resolution of lithographic techniques, but allows arbitrarily complex gap shapes within that restriction. Thus, the straight diagonal gaps needed for the servo patterns illustrated in FIGS. 4–9 are easily fabricated in this horizontal head design described above. Those skilled in the art will appreciate that a much more complex process would be needed to produce the desired gap structure in a vertical head because of the limits of planar processing.

Figure 23:
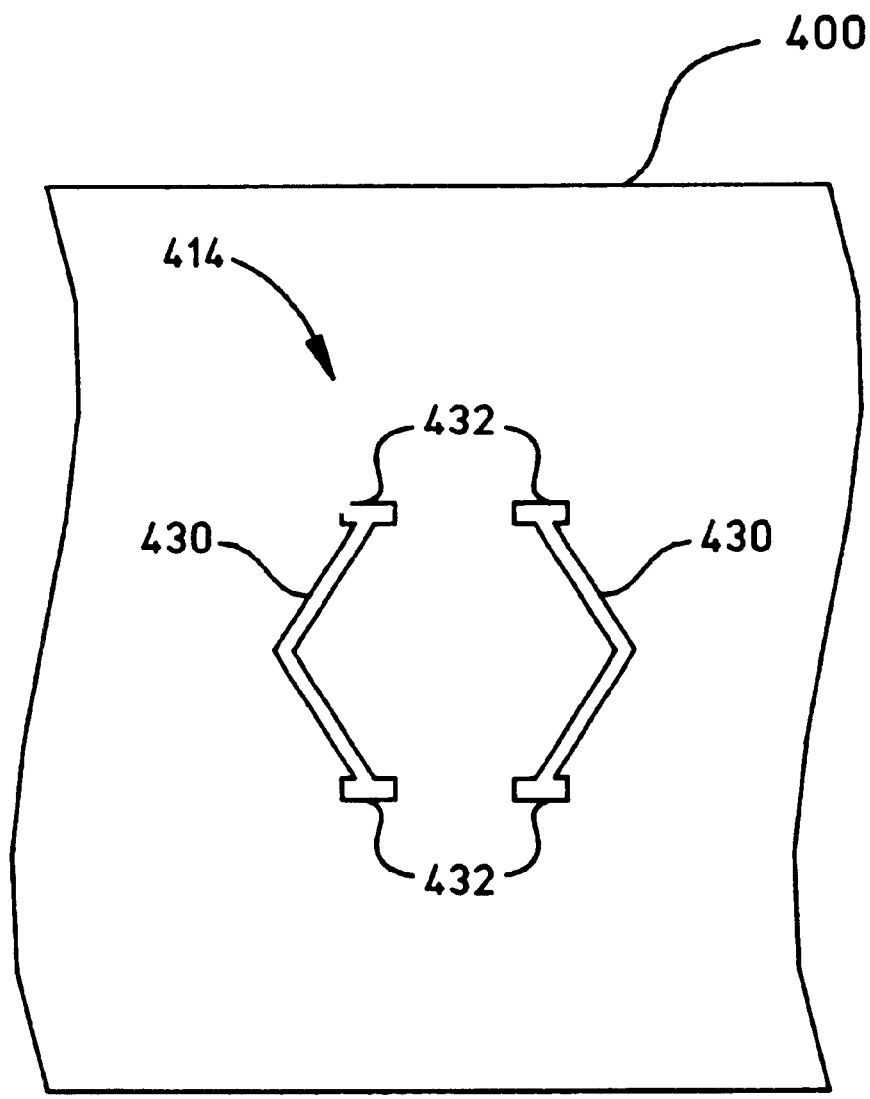
FIG. 23 is a plan view of the servo pattern gap region of the head illustrated in FIGS. 21 and 22.

One novel aspect of the head 400 is its use of magnetic saturation phenomena to simplify its design. The writing gaps 414, shown in greater detail in FIG. 23, are contained within a continuous sheet of magnetic NiFe. Conventional wisdom would dictate that the magnetic field in these gaps should be very small when this head is energized because almost all of the flux would flow through the low-reluctance NiFe rather than through the high-reluctance writing gaps. The gaps appear to be shunted by the sheet of NiFe. However, at larger currents the shunting regions of NiFe become magnetically saturated, causing the permeability to drop sharply. As saturation becomes more severe, the writing gaps become the preferred path for the additional flux. At high writing currents, this design generates the necessary gap fields to adequately write magnetic tape. This design provides an almost completely smooth surface for the tape to run over. More conventional designs would require wide isolation gaps to channel the magnetic flux into the writing gaps. Such isolation gaps provide high-pressure edges which will be subject to wear by the tape. These wide gaps also provide regions for tape debris to accumulate which can cause unwanted spacing between the head and tape. It should be noted that extra flares 432 are added to the writing gaps 430 to sharply demarcate the written pattern. If the flares are not present, the field across the writing gaps decreases at the ends. The flares act to maintain nearly the full writing field up to the end of the writing gaps.

Saturation effects are also used effectively to eliminate negative effects due to the magnetic seedlayer and the preferred magnetic wear overcoat. These layers are magnetic and cover the entire front surface of the head, including across the writing gaps 414. This shorting of the gaps would cause a problem except that these films are saturated at very low currents and cause no effect at higher writing currents. Those skilled in the art will recognize that the advantageous use of these saturation effects simplifies the design and improves the performance of this head.

Figure 24:
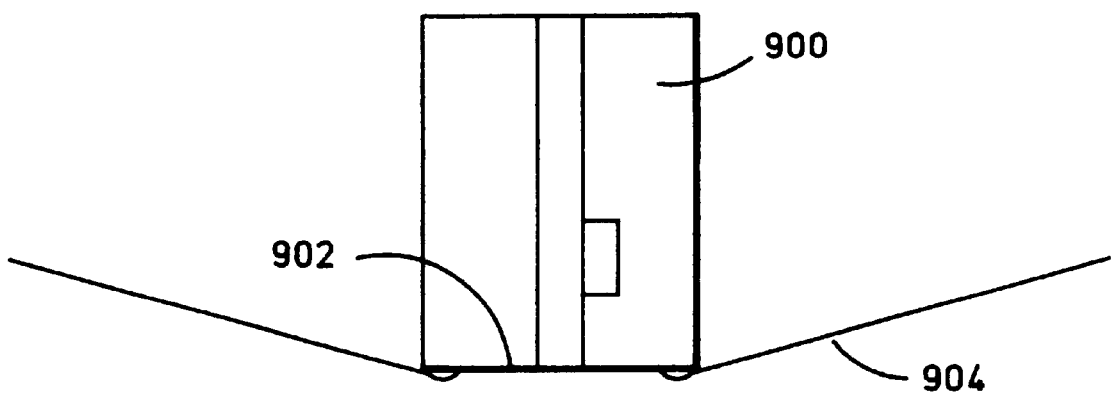
FIG. 24 is a schematic representation of a servo write head writing a magnetic tape constructed in accordance with the invention.

The preferred embodiment of the servo write head uses a cylindrically contoured head with cross-slots to maintain good contact between the head and the tape. Other techniques for maintaining this contact can also be used. In particular, a flat head with a small-radius edge can be used by overwrapping the tape around the edge. FIG. 24 illustrates this technique. The head 900 has a planar front surface 902. The tape 904 contacts the head with a slight overwrap (for example, 1°). The action of passing the tape over the overwrapped corner of the head acts to remove the layer of air between the head and the tape. The tape lifts slightly off the head near the corner because of its finite modulus of elasticity, but then comes into contact with the head. This technique may be used to maintain head-tape contact. Those skilled in the art will recognize that certain simplifications in the head fabrication process may be used to advantage by eliminating the cylindrical contour and cross-slots from the head design.

Figure 25:
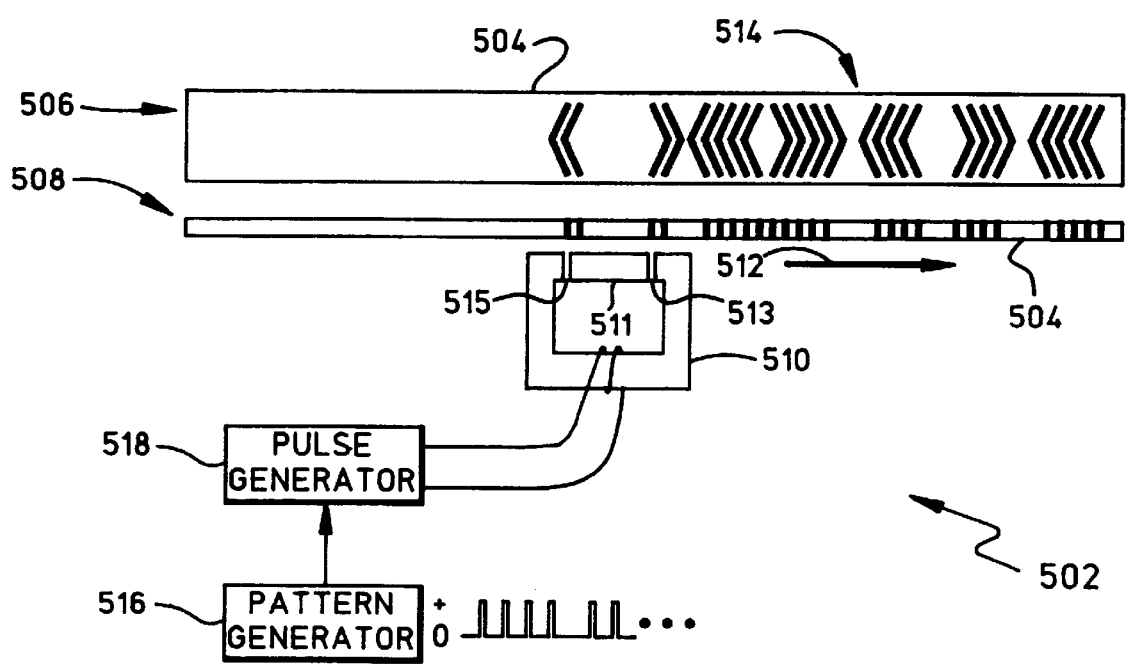
FIG. 25 is a schematic representation of a recording system for producing a magnetic tape in accordance with the present invention.

FIG. 25 illustrates the process of producing a magnetic tape having the servo patterns illustrated above using a pattern recording system 502. The system 502 can be provided, for example, in the tape drive 12 illustrated in FIG. 1. In particular, FIG. 25 illustrates the process of producing a magnetic tape having the servo pattern of FIG. 9 and shows a magnetic tape 504 in a top view 506 and in a side view 508 as it is passed in contact with a write head 510 such as that illustrated in FIGS. 21 and 23. The tape is passed in the direction indicated by the arrow 512.

The tape write head 510 ordinarily is not energized, but is periodically energized with a current pulse of predetermined polarity at predetermined times. That is, the head is switched between a zero current and a current of a single polarity. Those skilled in the art will note that this differs from conventional schemes, in which a magnetic write head is switched back and forth between opposite polarity currents. To produce the desired servo pattern on the tape 504, the tape is moved at a predetermined velocity while the write head 510 is intermittently pulsed with current. The intermittent current pulses of the write head produce flux patterns on the tape that are a copy of the head gap structure, as illustrated by the representation of the tape pattern 514 in FIG. 25. It should be clear from FIG. 25 that the two chevron-shaped write gaps are spaced apart sufficiently such that two opposed stripe bands, or diamonds, are recorded with each current pulse through the write head 510 and that the current pulses are timed to create the interleaved diamond pattern illustrated in FIG. 9, where a group of four interleaved diamonds is followed by a group of five interleaved diamonds.

FIG. 25 illustrates that the space 511 between the head write gaps is selected so that the interleaved pattern can be written in a single pass of the tape. The magnetic storage medium is moved in a head transducing direction at a predetermined velocity and the servo write head is energized with a predetermined polarity pulse to generate magnetic flux and automatically record one servo pattern transition stripe of the first azimuthal orientation and one servo pattern stripe of the second azimuthal orientation in a track on the tape with each energization. The head is repeatedly energized until the stripes recorded in the tape comprise one of the interleaved diamond groups. More particularly, the spacing between the servo write gaps is selected so that, at the tape writing speed. the transition stripe recorded by the trailing gap 513 at the last current pulse of a four-stripe or five-stripe group lies completely between the first stripes recorded by the leading gap 515 and trailing gap at the first current pulse of the group. Thus, after four or five activations of the head, as appropriate, the desired interleaved servo pattern is obtained.

Similarly, the synchronization feature spacing intervals are formed by continuing to move the tape at the predetermined velocity without energizing the servo write head to produce a servo pattern stripe. The extent of the spacing interval in the transducing direction is determined by the length of time the head is not energized and by the predetermined tape speed. Preferably, the time without energizing the write head is sufficiently long such that all of the stripes written by a group of pulses lie completely beyond the stripes written by the previous group of pulses. That is, all transition stripes of one group have passed by the trailing gap 513 before any stripes of the next group are written to the tape.

To write a non-interleaved pattern, such as illustrated in FIG. 8, the write gap spacing and pulsing of the head is such that the transition stripe recorded by the trailing gap during each current pulse lies completely beyond the stripe recorded by the leading gap during the previous current pulse. That is, the stripe written by the leading gap is moved past the trailing gap before the next energization of the write head. The synchronization features between stripe groups are formed by delaying energization of the servo write head to produce a servo pattern stripe for a sufficiently long time so that the minimum spacing along the transducing direction between the last stripe recorded by the leading gap during the last current pulse of a group and the first stripe recorded by the trailing gap during the first current pulse of the subsequent group is greater than the maximum distance in the transducing direction between any pair of sequential stripes within a group.

As illustrated in FIG. 25, a programmable pattern generator 516 of the servo pattern recording system 502 generates pulses that are provided to a pulse generator 518 that causes the intermittent energizing of the write head 510. Because the pulse width is finite and the tape is moving at a predetermined velocity, the servo flux patterns recorded onto the tape 504 are elongated versions of the actual gaps of the write head. The flux patterns recorded on the tape are wider than the gaps on the write head by the product of the tape velocity and the pulse width.

The servo pattern recording system 502 can operate with either AC or DC erased magnetic tape. If the magnetic tape 504 is AC-erased, meaning that the tape has zero magnetization, then the tape is magnetized with one polarity over the gap regions when the write head 510 is energized. The remainder of the tape is left with zero magnetization. If the magnetic tape is DC-erased, meaning that the tape is magnetized in one polarity, then the current through the write head 510 must be directed such that the recorded flux pattern stripes are magnetized in the opposite polarity. The resulting recorded pattern then consists of transitions between magnetized regions of opposite polarity. The signal produced when a servo pattern is read back from a DC-erased tape will have approximately twice the amplitude of the signal produced from an AC-erased tape. In the preferred embodiment, however, an AC-erased tape is used to prevent producing a signal so large that the servo read head becomes saturated. The magnitude of the write current can also be reduced to decrease the magnetization of the written regions of the tape, lowering the readback signal.

The pattern generator 516 in FIG. 25 may be constructed with several techniques which are familiar to one skilled in the art. For example, the required pulse pattern could be recorded in a programmable read-only memory (PROM) and cycled through with an appropriate addressing circuit. Alternatively, the required pulse pattern could be produced by a collection of suitable counters and associated logic. These techniques are familiar to those skilled in the art and require no further explanation.

It also should be appreciated that the accuracy of the servo pattern recorded on the tape depends on the accuracy of the pattern generation timing and of the tape velocity. The pattern generation timing preferably is crystal controlled and therefore is very accurate and stable. The tape velocity, however, is more difficult to control. In the preferred embodiment, a tape velocity accuracy of 0.1 % is required. An alternative to obtaining such accuracy is to measure the tape velocity near the write head and adjust the timing of the pattern generator to correct for tape velocity errors. Measuring the tape velocity can be accomplished, for example, with an accurate shaft encoder 505 rotated by the tape or with a laser doppler device. The details of such a tape velocity measurement system should be clear to those skilled in the art.

After the pattern pulses are generated, they must be converted into current pulses through the write head. In the preferred embodiment, pulse generator circuitry produces pulses with a duration of 150 ns, with up to 3 amps of peak current and a rise and fall time of less than 50 ns. Those skilled in the art will recognize that such a pulse generator can be constructed with, for example, a power MOSFET switch and a current-limiting resistor. These techniques will be readily apparent to those skilled in the art without further explanation.

Figure 26:
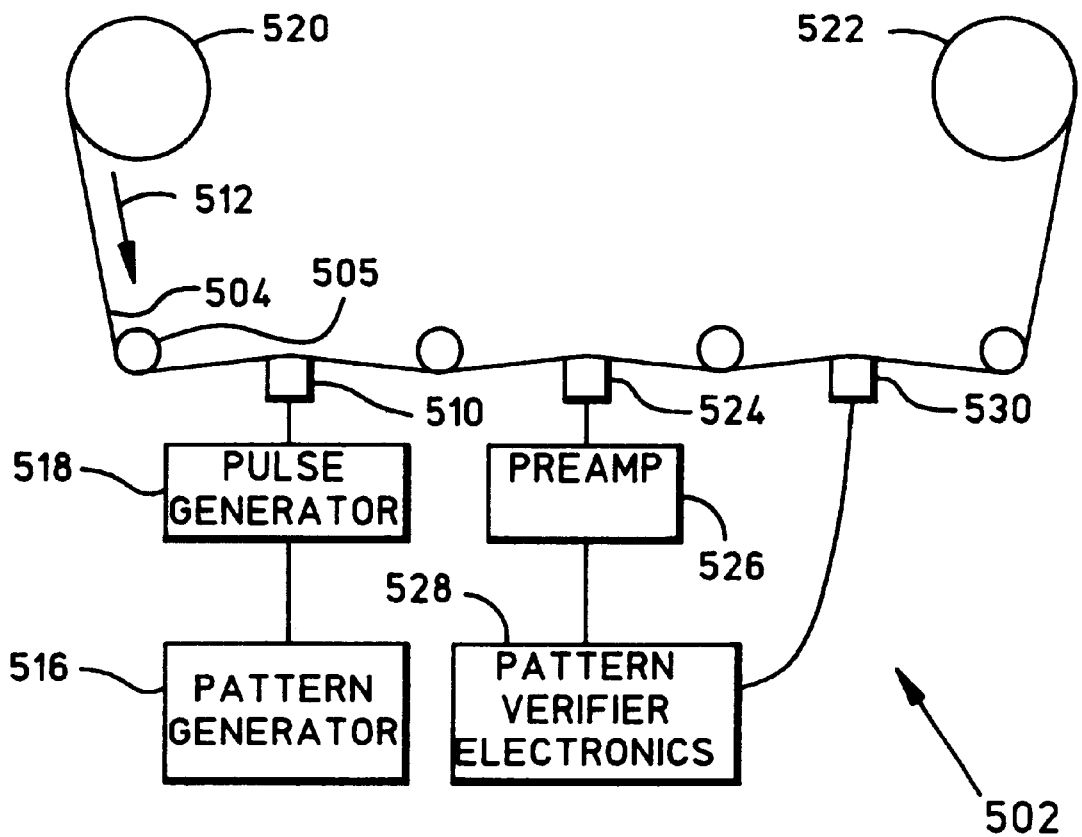
FIG. 26 is a schematic diagram of the recording system illustrated in FIG. 25.

FIG. 26 is a schematic diagram of the tape writing system 502 illustrating tape verification elements and showing that the tape 504 is passed from a supply reel 520 to a take-up reel 522 as the servo pattern is recorded onto the tape. The pattern generator 516 produces the pattern pulses, which are provided to the servo write head pulse generator 518 that intermittently energizes the write head 510. After the tape 504 is recorded with the servo pattern, the pattern must be verified to assure high quality. A servo read head 524 reads the just-recorded servo pattern and provides a servo signal to a pre-amplifier 526. The pre-amplifier provides an amplified version of the servo signal to a pattern verifer 528 that performs a variety of verifying operations, such as checking the servo pattern, signal amplitude, dropout rate, and consistency of redundant servo tracks. The verifier causes a bad-tape marking head 530 to place a magnetic mark on the tape 504 if any errors are found so that bad sections of tape are not loaded into a tape cartridge (FIG. 1)

Although this discussion has focused on dedicated servo track embodiments, this servo system is also applicable to embedded servo embodiments. In dedicated servo track systems, certain tracks on the tape are used exclusively for servo patterns. In operation a servo read element is always over one of these servo tracks while other elements are used for reading and writing data. Embedded servo systems spatially separate servo patterns and data blocks on the same track. With this approach, a single element can be used for reading both servo information and data The embedded servo approach decreases the servo sample rate and the data rate because a single element is used for both. One disadvantage to using the same head element for servo and data reading is that using a narrow servo read head is, for all practical purposes, precluded. However, other advantages are obtained, such as decreasing the number of elements needed in a head module and decreasing offset errors which result from using separate servo and data elements. Those skilled in the art will appreciate that the servo system described here can be extended to apply to embedded servo applications.

Thus, described above is a servo pattern of repeating magnetic flux transitions that extend across the width of each servo track such that they produce a servo position information signal that varies continuously as a servo read head is moved across the width of the servo track in the translating direction and the tape is moved beneath the head in the transducing direction, permitting the interval between transitions to be timed to thereby indicate the relative position of the magnetic head within the track. Also described above are a variety of servo write heads suitable for generating the servo pattern, including a preferred method of constructing a multiple gap servo write head. Also described above is a servo pattern writing system, including a tape verification system to ensure accurate reproduction of the servo patterns on tape.

The present invention has been described above in terms of presently preferred embodiments so that an understanding of the present invention can be conveyed. There are, however, many configurations for servo decoders, servo patterns, servo control systems, storage media, servo writing systems, data storage systems, and servo write heads not specifically described herein, but with which the present invention is applicable. The present invention should therefore not be seen as limited to the particular embodiments described herein, but rather, it should be understood that the present invention has wide applicability with respect to servo decoders, servo patterns, and servo write heads generally. All modifications, variations, or equivalent arrangements that are within the scope of the attached claims should therefore be considered to be within the scope of the invention.

We claim:

1. A servo write head that generates magnetic flux for producing a servo pattern in a magnetic storage medium for use in a computer storage media drive system, the head comprising:

a magnetically permeable core having a media-bearing contour surface with at least one core gap;

a magnetically permeable film layer that covers the media-bearing contour surface, bridging the core gap except for writing gaps in the film layer that define the servo pattern; and an electrically conductive coil wound around the magnetically permeable core.

2. A servo write head as defined in claim 1, wherein the core comprises:

two blocks of magnetically permeable material that are joined by a non-magnetic spacer that extends from one block to the other at the media bearing contour surface.

3. A servo write head as defined in claim 2, wherein the media-bearing contour surface is a planar surface.

4. A servo write head as defined in claim 2, wherein the media-bearing contour surface is a portion of a cylindrical surface.

5. A servo write head as defined in claim 2, wherein the magnetically permeable core material comprises ferrite.

6. A servo write head as defined in claim 2, wherein the non-magnetic spacer is glass.

7. A servo write head as defined in claim 2, wherein the magnetically permeable film layer comprises a NiFe alloy.

8. A servo write head as defined in claim 2, further including a protective overcoating on the magnetically permeable film layer that covers the contour surface.

9. A servo write head as defined in claim 8, wherein the protective overcoating comprises carbon.

10. A servo write head as defined in claim 8, wherein the protective overcoating comprises a magnetically permeable material.

11. A servo write head as defined in claim 10, wherein the magnetically permeable material comprises a NiFeN/FeN laminate.

12. A servo write head as defined in claim 1, wherein the writing gaps are shunted magnetically by permeable paths that saturate at operating flux levels.

13. A servo write head as defined in claim 12, wherein the writing gaps comprise small openings in a substantially continuous film of magnetically permeable material.

* * * * *